United States Patent [19]

Barkan et al.

[11] Patent Number: 4,676,610
[45] Date of Patent: Jun. 30, 1987

[54] METHOD OF MAKING PROGRESSIVE LENS SURFACE AND RESULTING ARTICLE

[75] Inventors: Eric F. Barkan; David H. Sklar, both of San Francisco, Calif.

[73] Assignee: Sola International Holdings Ltd., Morphet Vale, Australia

[21] Appl. No.: 516,366

[22] Filed: Jul. 22, 1983

[51] Int. Cl.$^4$ .......................... G02C 7/06; B29D 11/00
[52] U.S. Cl. .................... 351/169; 264/2.5; 351/177; 425/808
[58] Field of Search ............... 351/169, 159, 177, 168; 264/2.5; 425/808

[56] References Cited

U.S. PATENT DOCUMENTS

| | | | |
|---|---|---|---|
| 3,785,724 | 1/1974 | Cretin-Maitenaz | 351/169 |
| 4,056,311 | 11/1977 | Winthrop | 351/169 |
| 4,062,629 | 12/1977 | Winthrop | 351/169 |
| 4,118,853 | 10/1978 | Mignen | 29/424 |
| 4,315,673 | 2/1982 | Guilino et al. | 351/169 |

FOREIGN PATENT DOCUMENTS

| | | |
|---|---|---|
| 775007 | 5/1957 | United Kingdom . |
| 2056106 | 3/1981 | United Kingdom . |
| 2058391 | 4/1981 | United Kingdom . |
| 2069714 | 8/1981 | United Kingdom . |
| 2092772 | 8/1982 | United Kingdom . |

OTHER PUBLICATIONS

"Lens Design Fundamentals", R. Kingslake, AP-1978.
French Patent Application No. 2,509,482.

Primary Examiner—John K. Corbin
Assistant Examiner—Scott J. Sugarman
Attorney, Agent, or Firm—Burns, Doane, Swecker & Mathis

[57] ABSTRACT

The disclosure relates to progressive power or multifocal ophthalmic lens and methods and formers for making such lens. The optical power of such lens varies gradually from a near viewing zone to a distance viewing zone. Selected mathematical functions are progenitive of the lens and former shapes, and steps of the methods are characterized by various mathematical functions, and coordinate systems which are constrained to provided the desired transition of optical powers in an intermediate zone of the lens.

45 Claims, 12 Drawing Figures

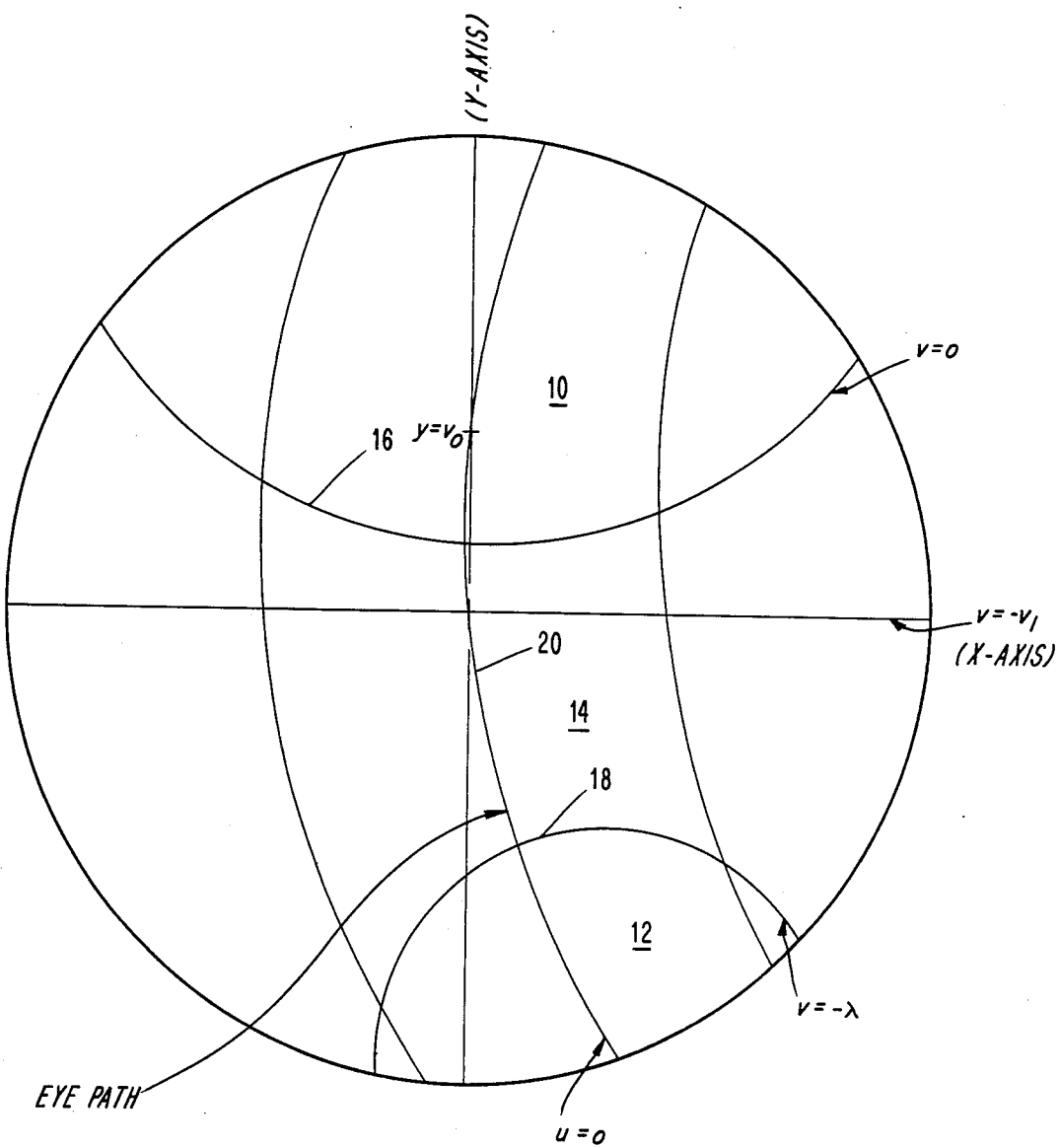

|       |       |       |       |       | .00 + | .00 + | .00 + | .00 + | .00 + |       |       |       |       |
|-------|-------|-------|-------|-------|-------|-------|-------|-------|-------|-------|-------|-------|-------|
|       |       |       |       | .00 + | .00 + | .00 + | .00 + | .00 + | .00 + | .00 + | .00 + | .00 + |       |
|       |       |       | .00 + | .00 + | .00 + | .00 + | .00 + | .00 + | .00 + | .00 + | .00 + | .00 + | .00 + |
|       |       | .06 + | .01 + | .00 + | .00 + | .00 + | .00 + | .00 + | .00 + | .00 + | .00 + | .01 + | .06 + |
|       |       | .16 + | .09 + | .01 + | .00 + | .00 + | .00 + | .00 + | .00 + | .00 + | .01 + | .09 + | .16 + |
|       | .14 + | .26 + | .26 + | .15 + | .04 + | .00 + | .00 + | .00 + | .00 + | .04 + | .15 + | .26 + | .26 + | .14 + |
|       | .14 + | .32 + | .44 + | .44 + | .32 + | .15 + | .04 + | .01 + | .04 + | .15 + | .32 + | .44 + | .44 + | .32 + | .14 + |
|       | .11 + | .34 + | .56 + | .67 + | .67 + | .54 + | .35 + | .24 + | .35 + | .54 + | .67 + | .67 + | .56 + | .34 + | .11 + |
|       | .05 + | .30 + | .56 + | .72 + | .71 + | .61 + | .68 + | .80 + | .68 + | .61 + | .71 + | .72 + | .56 + | .30 + | .05 + |
|       | -.02 +| .19 + | .44 + | .52 + | .41 + | .49 + | 1.06 +| 1.38 +| 1.06 +| .49 + | .41 + | .52 + | .44 + | .19 + | -.02 +|
|       |       | .00 + | .16 + | .11 + | .05 + | .74 + | 1.50 +| 1.62 +| 1.50 +| .74 + | .05 + | .11 + | .16 + | .00 + |       |
|       |       | -.26 +| -.26 +| -.39 +| .05 + | 1.28 +| 1.60 +| 1.62 +| 1.60 +| 1.28 +| .05 + | -.39 +| -.26 +| -.26 +|       |
|       |       |       | -.79 +| -.75 +| .53 + | 1.45 +| 1.57 +| 1.59 +| 1.57 +| 1.45 +| .53 + | -.75 +| -.79 +|       |       |
|       |       |       |       | -.75 +| .90 + | 1.38 +| 1.53 +| 1.57 +| 1.53 +| 1.38 +| .90 + | -.75 +|       |       |       |
|       |       |       |       |       |       | 1.25 +| 1.44 +| 1.50 +| 1.44 +| 1.25 +|       |       |       |       |       |

METHOD OF MAKING PROGRESSIVE LENS SURFACE AND RESULTING ARTICLE

BACKGROUND OF THE INVENTION

This invention is related to ophthalmic lenses and, in particular embodiments, to novel progressive power and multifocal ophthalmic lens in which a surface of the lens has distance, near and intermediate viewing zones with boundaries and contours which provide desired optical properties over the surface of the lens. Disclosed methods permit the making of lenses with these properties while providing flexibility in the selection of wearer-adapted parameters.

The direct ancestor of the progressive multifocal lens is the bifocal lens which consists of a distance viewing zone of one optical power and a near viewing zone of another optical power, located adjacent the distance zone. Each zone may have a convex spherical surface with an abrupt change in curvature at a boundary where the zones abut. These lenses have the disdvantage that they are limited to two, more or less fixed optical powers. The change in power at the zone boundary can produce undesirable optical effects for the wearer. In addition, the zone boundaries are sometimes considered unattractive when the lens is viewed on the wearer.

Over the last 70 or 80 years attempts have been made to achieve a progressive increase in optical power from a distance viewing part of a lens to a near reading part of the lens. In so doing astigmatism and distortion are necessarily introduced into the lens.

British Pat. No. 775,007, to Jeffree, discusses at page 1 problems faced by the lens designer in achieving an acceptable lens of this type. One design technique mentioned by Jeffree is to maintain changes in horizontal and vertical curvature of the lens at the same magnitude. This is said to result in a lens with no unwanted astigmatism along a lens meridian, but such a lens is said to have increasingly severe oblique astigmatic errors are increasing lateral distances from the meridian. On the other hand, according to Jeffree, it is possible, by making the changes in horizontal curvature less than that of the vertical curvature to an appropriate degree, to produce lenses with no unwanted astigmatism of the type that increases with lateral distance from the meridian, but instead with unwanted astigmatism dependent on height from the bottom of the lens. A variety of compromises between these two cases is said to be possible.

Other designers have tried to minimize the effect of the astigmatism introduced into the lens. Some designers have attempted to concentrate the astigmatism into relatively unused portions of the lens. See, for example, British Pat. No. GB 2,056,106A to Younger Manufacturing Company; British Pat. No. GB 2,069,714A to Itek Corporation; U.S. Pat. No. 4,056,311 to Winthrop. Other designers have attempted to spread the astigmatism over a larger portion of the lens, thus decreasing the maximum value of astigmatism. See the comparative examples of U.S. Pat. No. 4,315,673 to Guilino et al.

Some prior art designs have as a goal the making of a progressive lens with substantially no astigmatism in a large distance viewing zone. An example of such a lens can be seen in FIG. 1 which is a reproduction of FIG. 4 of U.S. Pat. No. 3,785,724 to Cretin-Maitenaz. The resulting boundaries between the distance viewing zone and the progressive portion of the lens tend to be more apparent to the eye.

In other prior art lenses, zone boundaries are more diffuse and not so apparent on moving from the distance viewing zone to the progressive zone. An example of such a design is illustrated in FIG. 2, which is a reproduction of FIG. 7 of British Pat. No. 2,058,391A to Suwa Seikosha. The design methods of the present invention are adaptable to produce lenses with both sharp and diffuse zone boundaries. To the extent that the above-mentioned art is understandable, it is not believed to foreshadow the techniques of the present invention.

Certain characteristics in the progressive lens are desirable. The intermediate zone should join the near and distance zones in a cosmetically acceptable way, in the sense that no discontinuities in the lens should be visible to people observing the lens on the wearer. The intermediate zone should be optically acceptable in the sense that there should be a line or corridor, called the eye path, along which the line of vision moves while going between the distance and near zones and along which the optical power of the lens increases more or less uniformly. The quality of vision along the eye path should be as good as possible to permit some intermediate viewing through the intermediate zone and to provide a comfortable transition in powers for the eye between the near and distance zone. This result is furthered by minimizing or removing astigmatism along the eye path. It is possible to select an eye path with a slant to accommodate the natural convergence of the eyes. It may also be desirable to select particular shapes for the zones. Examples of zones of various shapes are illustrated in British Pat. No. 2,092,772A to Winthrop.

In order to understand problems associated with the provision of these desirable lens characteristics, it is helpful to understand how such lenses are made and dispensed. Finished progressive lenses are typically made from progressive lens blanks, i.e. optical bodies having a finished convex front progressive surface and a unfinished rear concave surface. The rear surface is normally finished to produce a lens which meets the wearer's prescription. However, to provide a range of distance and near zone optical powers which permit optimum fitting of the lens to most presbyopic patients, a family of progressive lens blanks with different distance and near zone powers should be available. In such a family, each blank will incorporate a similar selection and/or optimization of some or all of the above-mentioned basic design characteristics. Such a consistency is an aid in the designing, manufacturing, testing and prescribing of the lenses.

However, it is not a simple matter to choose an appropriate generalized expression to describe the progressive properties of a family of lens blanks. Such an expression needs to be one which readily permits alteration of distance zone power and near zone power, to obtain the desired specific characteristics of one of the family of lens blanks. In addition the design techniques, should, advantageously permit generation of different families of lenses, embodying different selections of other parameters such as zone size and placement, eye path location, etc.

Accordingly, it is an object of the present invention to provide a method for making lenses in which design parameters may be easily manipulated to produce progressive lenses having varying ophthalmic properties.

It is another object of the present invention to provide a method for making a progressive lens in which astigmatism and distortion are selectively distributed to improve optical and/or cosmetic properties of the lens.

It is another object of the present invention to provide a method for making a progressive lens in which the optical power, shape, size and/or location of the distance or near zones may be easily modified from lens to lens.

It is another object of the present invention to provide a method for making a progressive lens in which selected design parameters may be easily modified to improve astigmatism or distortion characteristics of the lens.

It is another object of the present invention to provide progressive lenses and progressive lens families with a large distance viewing zone, a large near viewing zone, a wide eye path corridor, and little or no astigmatism along the eye path.

These and other objects and features will be apparent from this written description and the appended drawings.

SUMMARY OF THE INVENTION

The present invention relates to progressive power ophthalmic lenses. As used herein the word "lens" refers to all forms of refractive optical bodies employed in the ophthalmic arts, including, but not limited to, semifinished lens blanks requiring further finishing to a particular patient's prescription. Also included are formers used in the manufacture of progressive glass lenses, and molds for the casting of progressive lenses in polymeric materials such as the material sold under the trade name CR 39.

The present invention embraces a method for making a progressive lens having a distance viewing zone, a near viewing zone and an intermediate zone lying between boundaries with the distance and near zones, in which intermediate zone, there is a gradual change in optical power along an eye path from the distance zone to the near zone. The method includes selecting a base surface function progenitive of prescribed optical properties in the distance zone. This base surface may be a spherical surface with sufficient optical power to provide corrected vision for distance viewing. A two dimensional coordinate system (u, v) is selected in which the eye path is defined by the limitation that along the eye path, u equals a constant and in which the zone boundaries are defined by the limitation, v equals a constant. A near zone add surface function is defined such that when the near zone add surface function is summed with the base surface function, a surface is provided which approximates the prescribed optical properties in the near zone. A preliminary polynomial function is derived in the coordinate system (u, v) such that the preliminary function defines a surface for the intermediate zone so that the surfaces of the zones are the same height at zone boundaries and so that at least the first two partial derivatives of the surface function with respect to v are the same at the boundaries. The polynomial function may be of low degree, for example, 8th degree in u and the 7th degreee in v in a preferred embodiment. The cartesian coordinates x and y may be translatable in polynomials of the second degree in u and v.

In a preferred embodiment, auxiliary functions are chosen to modify the optical properties of the lens in certain selected areas of the lens. A mathematical product may be obtained by multiplying the preliminary function and the auxiliary function in the intermediate zone. Similarly, the auxiliary function may be multiplied with the add surface function in the near zone to produce a second product. The base surface function may then be added to the products in the respective zones to provide a final surface function defining the surface of the near zone and intermediate zone. Finally, an optical body may be formed with a surface substantially characterized, in the distance zone, by the base surface function and, in the intermediate and near zone, by the final surface function. The forming may be accomplished by sag molding a glass blank on a machined porous former configured in accordance with the final surface function.

The foregoing method may be repeated in an iterative fashion while varying one or more of the lens parameters and evaluating the resultant mathematical function or the lens itself for desirable properties including reduction of astigmatism and distortion.

The present invention also embraces a multifocal, progressive lens and formers therefor with a progressive surface having a near viewing zone, a distance viewing zone and an intermediate zone in which there is gradual change in optical power along an eye path from the distance zone to the near zone. The boundaries between the distance zone and the intermediate zone, and between the intermediate zone and the near zone, may be substantially defined as projections of algebraic curves on the lens surface. In preferred embodiments these algebraic curves are parabolas. The shape of the surface of the lens may be substantially defined by a final surface function selected so that the surfaces of the zone are the same height at the boundaries and so that at least the first three derivatives of the final surface function are continuous across the boundaries. The final surface function and coordinate system transformations may be defined by polynomial expressions as discussed above.

A preliminary function may be obtained defining the progressive surface. The surface may then be evaluated (e.g. for power, astigmatism, orthoscopy) and zone boundary geometry parameters modified in an iterative fashion.

In other embodiments the final surface function may be a function which is product of a preliminary function and at least one auxiliary function, wherein the preliminary and auxiliary functions are both continuous to at least the third derivative along the boundaries of the zones. The auxiliary function may be selected to improve orthoscopy in at least a portion of the intermediate zone. As used herein "orthoscopy" is intended to refer to the rectangularity of images of vertically oriented rectangular objects observed through the lens. In other embodiments an auxiliary function may be selected to reduce astigmatism in at least a portion of the intermediate zone. As used herein the word "astigmatism" refers to surface astigmatism, which is a measure of the degree to which the curvature of the lens varies along intersecting planes which are normal to the surface of the lens at a point on the surface. In still other embodiments, both types of auxiliary functions may be employed. The preliminary function may be multiplied with auxiliary function(s), the resulting surface or surface function evaluated, and the auxiliary function(s) modified in an iterative fashion to reduce astigmatism and/or improve orthoscopy in selected regions of the lens, while retaining desirable properties of the preliminary function in other areas of the lens.

BRIEF DESCRIPTION OF THE DRAWINGS

FIG. 5 is a cross-sectional profile of a progressive surface of a lens embodiment of the present invention.

FIG. 6 is an array of calculated values related to surface heights for a particular progressive surface of the present invention.

FIGS. 7a and 7b are, respectively, an array of calculated values of the astigmatism of the progressive surface of FIG. 6, and an array of calculated values of the mean power of the progressive surface of FIG. 6.

DETAILED DESCRIPTION

Figure 1:
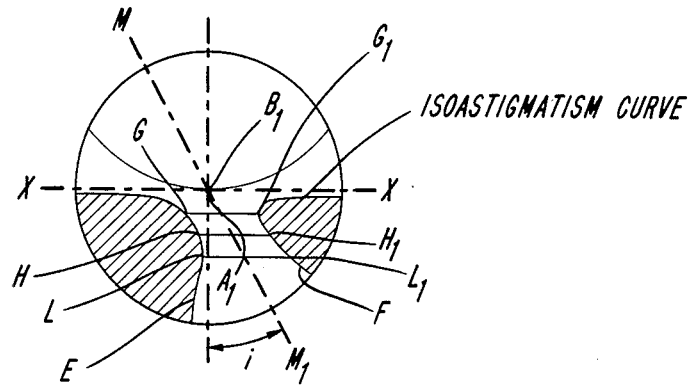
FIG. 1 is a front elevation of a prior art progressive lens with a relatively large distance viewing zone having sharp boundaries.
Figure 2:
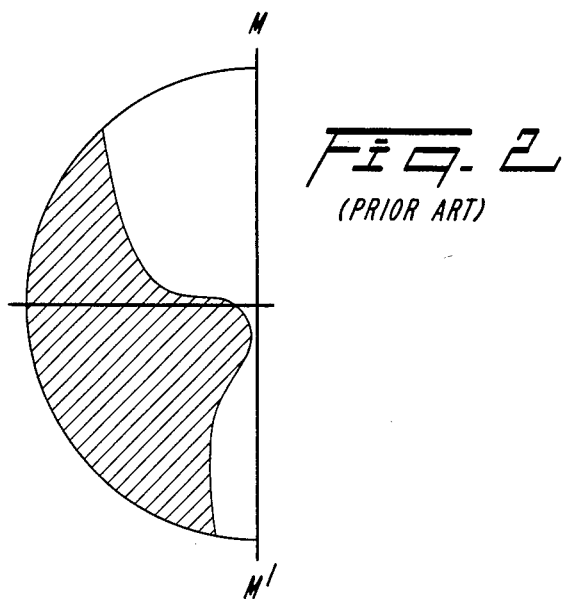
FIG. 2 is a front elevation of a prior art progressive lens with a relatively smaller distance viewing zone with more diffuse boundaries.
Figure 3:
FIG. 3 is a front elevation of a progressive lens embodiment of the present invention illustrating a coordinate system used to define a surface of the lens.

A progressive ophthalmic lens, made according to the present invention is shown in FIG. 3. The lens may be divided into three zones. The top, or distance, zone 10 is intended to provide the user with conventional distance correction substantially unimpaired by any effects from the special optical zones below. The bottom, or near zone 12 should likewise provide good vision with increased positive power for near vision tasks, as in a conventional bifocal. A central, or intermediate zone 14 lies between the distances and near zones. A first boundary 16 lies at the meeting of the distance and intermediate zone, and a second boundary 18 lies at the meeting of the intermediate and near zones. The boundaries may be diffuse or sharp. The significance of the boundaries to the design of the lens will be discussed below.

The intermediate zone 14 is intended to join the distance and near zones in a way that is cosmetically acceptable in the sense that no discontinuities are apparent to persons viewing the lens on the wearer. The transition is optically acceptable, in the sense that there is a narrow corridor or eye path 20, along which the line of vision moves while going between the distance and near zones, and along which the optical power preferably increases more or less uniformly from that of the distance zone to that of the near zone. Desirably, the quality of vision along this eye path should be as good as possible so that the wearer will experience a minimum of discomfort as his gaze moves back and forth between distance and near zones. As a practical matter this gives rise to a need to correct astigmatism as well as possible along the eye path. The present design provides acceptably small astigmatism (i.e., less than 0.5 diopter) along the eye path, without requiring it as an explicit design limitation.

The eye path should deviate from a vertical centerline of the lens as shown in FIG. 3, in order to accomodate the natural convergence of the eyes as they move from distance to near vision. In addition, the boundaries 16 and 18 may be curved so as to allow the joining of the zones over a great distance and over a large part of the lens. This may also help to limit aberrations in the intermediate zone.

In order to meet these several requirements simultaneously and in order to permit selective changes in one or more design parameters, a novel coordinate system has been devised. In this coordinate system the special curves of the problem—the interzone boundaries and the eye path—are represented in a simple way, as curves along which one or another of the coordinates takes on a constant value. Relatively simple coordinate transformations, connecting this new system with ordinary cartesian coordinates, have been devised to define the lens structure. Polynomial functions are used as base functions to describe the optical surface and the coordinate system. Boundary conditions are imposed which produce equations in the coefficients of the polynomials which can be solved to provide a final surface function for the lens.

In making the lens, two additional assumptions may also be made. First, it may be assumed that a usable solution can be obtained ignoring any effects of the obliquity with which rays may strike the optical surfaces of the system and ignoring any higher order effects of variations in the thickness of the lens. Second, it is assumed that a usable solution can be obtained by representing all surface curvatures by means of simple second order partial derivatives, ignoring the nonlinear first derivative tilt factors.

These initial simplifications have been found not to stand in the way of good optical correction of a finished design. The simple system as described above may be used as a starting point for a basic design and manufacturing system. The basic design can then, if necessary, be analyzed by means of exact ray-trace analysis to permit the adjustment of the near zone function to deal with problems observed at that stage, especially localized problems of excessive astigmatism or distortion in the intermediate zone.

The following is a summary of the contents of this detailed description of preferred embodiments of the present invention.

I. Coordinate System Selection—The coordinate system used to provide the desired solution is described.

II. Surface Definition—The actual algebraic forms to be used to describe the surface are presented.

III. Boundary Condition Selection—The optical requirements are formulated in terms of conditions to be satisfied by the surface functions along the zone boundaries. These conditions result in a system of simultaneous equations which are to be satisfied by the as yet unknown coefficients of the surface functions.

IV. Eye Path Specification—Choices are made with regard to the surface properties along the eye path. These choices provide additional equations in the coefficients, resulting in a solvable system.

V. Selection of Near Zone Function Parameters—Methods of selecting and modifying the near zone function to fine-tune the lens design are discussed.

VI. Formulation and Solution of Simultaneous Equations—The system of equations is solved by numerical methods.

VII. Presentation of Exemplary Values For Calculated Constants—Values obtained for the coefficients of a final surface function are presented for a particular lens design.

VIII. Computation of The Normal Vector—A unit normal vector anywhere on the surface may be required for manufacture of the lens or evaluating its optical properties. Formulas useful in obtaining the normal vector are presented.

IX. Evaluation of Lenses—Actual and calculated values of astigmatism and mean power for a lens example are discussed.

Figure 8:
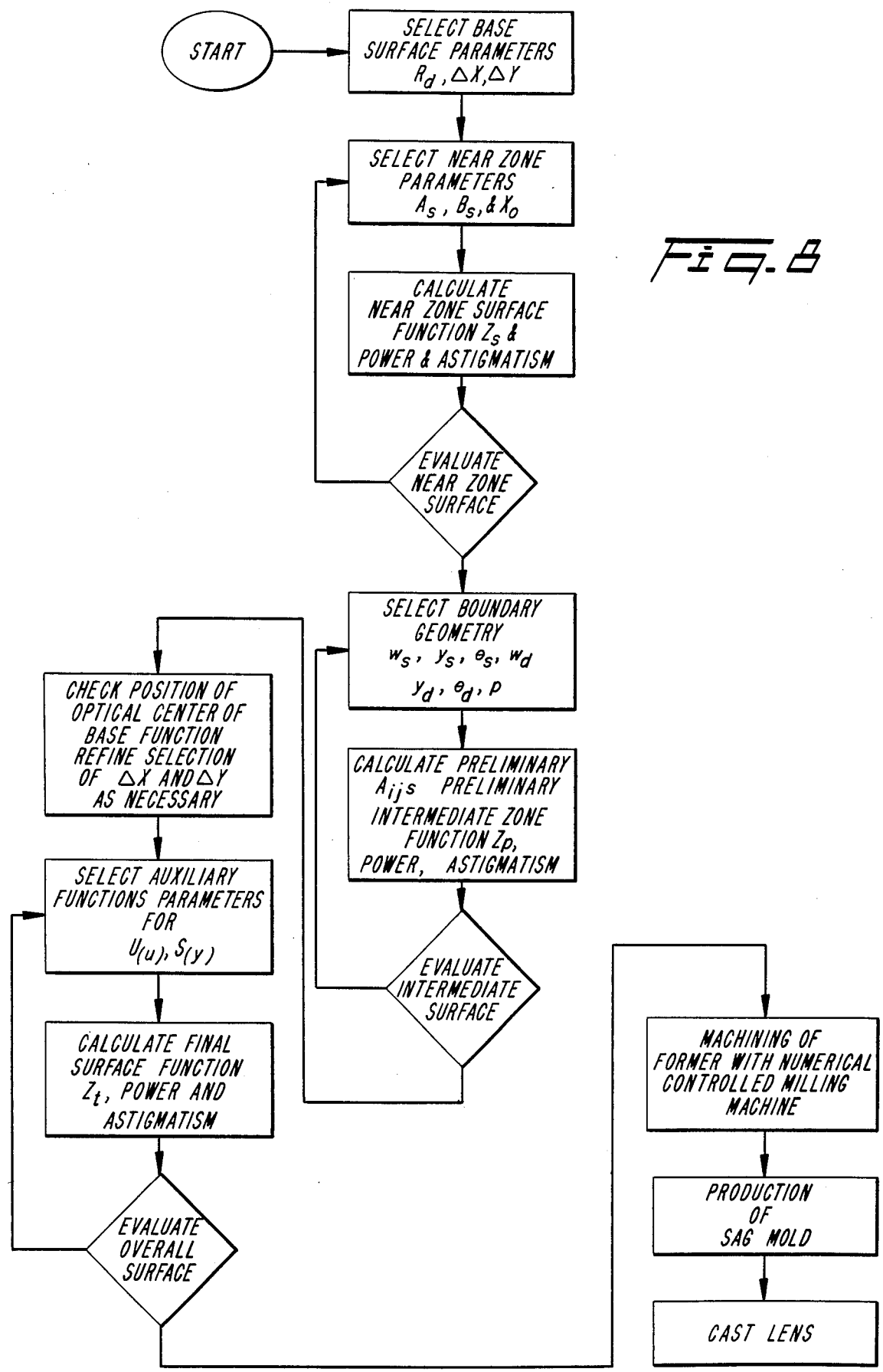
FIG. 8 is a flow diagram illustrating steps of a process for making a cast lens.

X. Manufacture of Lenses and Associated Tooling—Processes for performing the foregoing calculations and forming lens, based on the flow diagram of FIG. 8, are discussed.

I. COORDINATE SYSTEM SELECTION

The curvilinear coordinate system (u,v) has been devised to allow the designation of the boundaries between the principal regions of the lens by curves of the form v=constant, where v is the new coordinate corresponding most nearly to the vertical cartesian coordinate y. Curves 16 and 18 of FIG. 3 are examples of such curves. The coordinate system also allows the designation of a eye path in the form u=constant where u is the new coordinate corresponding most nearly to the horizontal cartesian coordinate x. The line 20 of FIG. 3 represents such an eye path.

The coordiate system developed is one in which x and y are polynomial functions of the new coordinates u and v and where these polynomials are of the minimum degree consistent with the desired qualitative properties of the coordinate system. Thus x and y are to be expressed in the form:

$$x = \sum_{i=0}^{p} \sum_{j=0}^{q} X_{ij} u^i v^j \quad (1A)$$

$$y = \sum_{i=0}^{r} \sum_{j=0}^{s} Y_{ij} u^i v^j \quad (1B)$$

where $X_{ij}$ and $Y_{ij}$ are coefficients, $u^i$ and $v^j$ are the coordinates of the curvilinear coordiate system, raised to the ith and jth power, respectively; p and q are the degrees of u and v for definition of x, respectively, and r and s are the degrees of u and v for definition of y. The selection of the system parameters p, q, r and s are preferably kept as small as possible, and are equal to two or less in the preferred embodiments discussed below.

The desired general shape of the u and v coordinate curves are shown in FIG. 3. The curves u=constant are nearly vertical, gently curving lines. This choice is made to permit the simple specification of a nasally converging eye path as u=0. The uniform horizontal spacing of these lines along the x axis permits a minimum degree representation. The curves v=constant, are seen to be parabola-like curves. The curve $v=-v_1$ is a straight line which coincides with the x axis. This choice of curves permits a natural designation of the boundary between the intermediate and near zones as the curve $v=-\lambda$, where $\lambda$ is a constant selected in a manner discussed below. The boundary between the distance and intermediate zone is the curve v=0. The size of the near region can be determined by adjusting the rate of increase of curvature of the v=constant curves with respect to v in such a way that the curve at $v=-\lambda$ yields a near zone of the desired size: the greater the curvature the smaller the near zone.

Useful coordinate transformations for the coordinate system are given by:

$$x=(c/v_o)(v+v_1)(v_o-v_1-v)(au^2+1)+u \quad (2A)$$

$$y=(v+v_1)(au^2 1) \quad (2B)$$

wherein a, c, $v_o$ and $v_1$ are constants which depend on the coordinate system used and certain design parameters of the lens discussed below. Typical values for these constants are:

a=from 0 to 1 $mm^{-2}$
c=from $-1$ to 1
$v_0$=greater than 1 mm
$v_1$=from $-100$ to 100 mm The transformations of equations (2) are effective for designs in which the surface of the upper half lens is exactly spherical as well as nonspherical surfaces. The above transformations are also adequate to provide for a diffuse top boundary and also for decentration of the distance and near zones, i.e., the center lines 22 and 24 of the distance and near zones shown in FIG. 4 can be made nonparallel to one another.

The constants in the above transformations may be interpreted as follows. It may be observed that, along the line $v=-v_1$, x equals u and y equals zero. Thus the curve $v=-v_1$ coincides with the x axis and along that line u is exactly equal to x. The surface specification in section II., below, defines the curve V=0 as the distance-intermediate zone boundary. The curve u=0 crosses the y axis at $v=-v_1$ and at $v=v_o-v_1$. See FIG. 3. The first of these points is just the (x, y) origin. Thus, $v_o$ determines the point at which the curve u=0 recrosses the y axis. This point determines the amount of decentration between the distance and near zones. The quantitative relations between these constants and the basic geometry of the zone boundaries will now be developed.

Figure 4:
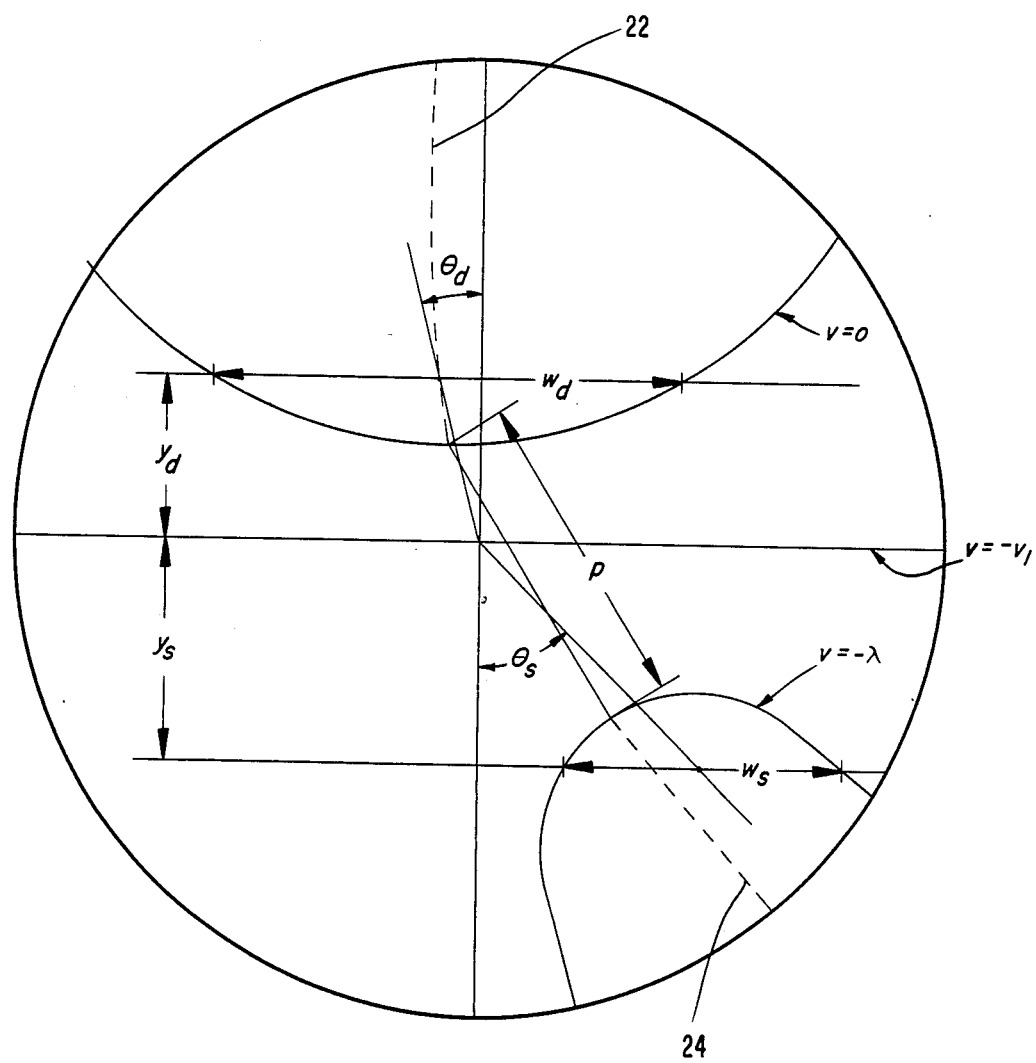
FIG. 4 is a front elevation of a progressive lens embodiment of the present invention illustrating parameters used in the design of the lens.

In order to obtain the values of the coordinate system parameters $v_1$, a, c, $v_o$ and $\lambda$, it is useful to first define some additional geometric parameters which are shown in FIG. 4. The shapes and orientations of the boundary curves are defined by the quantities $w_d$, $w_s$ (the widths of the distance and near zones at heights $y_d$ and $y_s$ respectively), $\theta_d$, $\theta_s$ (the tilt angles of the distance and near zones respectively), and p (the straight line distance between the points at which the eye-path intersects the top and bottom boundaries). These parameters, $w_d$, $w_s$, $y_d$, $y_s$, $\theta_d$, $\theta_s$ and p are starting design prerequisites on which the lens topography is to be developed. Values for the coordinate system parameters may be obtained in terms of geometric parameters such as these.

An expression for $v_1$ is a follows:

$$v_1=[-B+(B^2-4AC)^{\frac{1}{2}}]/2A \quad (3)$$

where
$A=w_d^2-w_s^2$;
$B=w_s^2(y_d+\lambda)-w_d^2(y_s+\lambda)$; and
$C=-w_s^2 y_d \lambda$.

An expression for a is as follows:

$$a=(4/w_d^2)[(y_d/v_1)-1] \quad (4)$$

where $v_1$ is as given above.

Expressions for c and $v_o$ are as follows:

$$c = [(v_1 - \lambda) \tan \theta_d - v_1 \tan \theta_s]/\lambda \tag{5}$$

$$v_o = [(v_1 - \lambda) \tan \theta_d v_1 \tan \theta_s]/(\tan \theta_d - \tan \theta_s) \tag{6}$$

wherein $v_1$ is as given above, and $\lambda$ is as given below. Thus, the constants of the transformation equations (2A) and (2B) are defined in terms of significant design parameters relating the shape, location and size of the zones of the lens. It is possible to solve the system of equations for $\lambda$ by the Newton-Paphson method. We begin by choosing p as an initial guess for $\lambda$. This is reasonable since $\lambda$ can be assumed to be sufficiently close to the eye path length for solution purpose. We then use the formulas (3), (4), (5) and (6) respectively to compute corresponding values for $v_1$, a, c, and $v_o$. These values are then used to compute g(p) from the equation:

$$g(\lambda) = \lambda^2[c^2(v_o + \lambda - 2v_1)^2 + v_o^2] - (v_o p)^2 \tag{7}$$

The initial guess (p) for $\lambda$ is then incremented by some small quantity $\sigma$ and then $g(p+\sigma)$ and the difference quotient are computed to estimate $g'(p)$. These values for g and g' are then used to compute a new value of $\lambda$ using Newton-Paphson method after which corresponding values of $v_1$, a, c, and $v_o$ are again computed, g and g' are modified and the loop repeated until the change in $\lambda$ becomes sufficiently small, for example 1 micron. The values of $\lambda$, $v_1$, a, c, and $v_o$ obtained at the end of the loop constitute the solution values for the system of equations (3) through (7) and the problem is solved.

Returning to general considerations regarding the coordinate system, we may obtain inversions of the coordinate tranformations (2A) and (2B) to yield u and v in terms of x and y. We may proceed by eliminating the quantity $(v+v_1)$ by first solving for it in the y equation (2B) to get:

$$(v + v_1) = y/(au^2 + 1) \tag{8}$$

and then substituting this into the x equation (2A), yielding:

$$x = (c/v_o)[y/(au^2+1)]\{v_o - [y/(au^2+1)](au^2+1)\} + u \tag{9}$$

After some algebra, this can be simplified to the equivalent equation:

$$v_o(x-u)(au^2+1) - cy[v_o(au^2+1) - y] = 0. \tag{10}$$

For convenience below the function on the left above is designated f(u). Therefore, $$f(u) = 0. \tag{11}$$

Since all the constants (viz.: $v_o$, a, y, $v_o$) as well as the values of x and y are given, the above is a cubic equation in the single unknown u. In principle it may be solved for u using the cubic formula, but this is a difficult procedure, and the solution can be approached numerically by resort to Newton's method. The choice of a first guess for u is somewhat more difficult here than for the other iterative solutions described in this application. One possibility is:

$$u_o \approx x - cy \tag{12}$$

where $u_o$ is the initial guess for u. A careful examination of f(u) has shown that this guess will always guarantee convergence of the iteration as long as the inverse transformation is single valued (and therefore meaningful in this context). This follows from the fact that all roots can be shown to lie to the left of $u_o$, that $u_o$ can never lie between the local extrema of f(u) (if any exist) and that the value of f(u) at its inflection point is positive when extrema exist. The inverse transformation is believed to be always single-valued over the usable lens surface, but singularities (non-invertibilities) may exist just off the lens.

With a good first guess in hand, the iteration may proceed. The derivative of f(u) is computed:

$$f'(u) = v_o[2au(x-u) - (au^2+1)] - 2acv_o yu \tag{13}$$

where f'(u) is the derivative of f(u) with respect to u. Improved guesses for u are then made by iteration using Newton's method:

$$u_{n+1} = u_n - f(u_n)/f'(u_n) \tag{14}$$

where $u_n$ is the current guess and $u_{n+1}$ is the next guess. The initial guess is given by $u_o$ above. The iteration is halted when the change in u from one stage to the next is less than some predetermined value, say, 1 micron. The resulting final value of u is then taken as the value determined by the given values of x and y, and the corresponding value of v is computed by solving the transformation equation (2B) for v:

$$v = [y/(au^2+1)] - v_1. \tag{15}$$

The results may be checked by back substitution into the coordinate transformations (2). The computed values of u and v should give back the originally given values of x and y.

The derivatives of x and y with respect to u and v will be required below. They are:

$$\frac{\partial x}{\partial u} = x_u = (2ca/v_0)u(v + v_1)(v_0 - v_1 - v) + 1 \tag{16A}$$

$$\frac{\partial x}{\partial v} = x_v = (c/v_0)(au^2 + 1)[v_0 - 2(v_1 + v)] \tag{16B}$$

$$\frac{\partial y}{\partial u} = y_u = 2au(v + v_1) \tag{16C}$$

$$\frac{\partial y}{\partial v} = y_v = au^2 + 1 \tag{16D}$$

where $x_u$ is the partial derivative of x with respect to u, etc.

In order to be able to compute the normal vector to the lens surface (see Section VIII), the derivatives of u and v with respect to x and y may be found. Since a numerical technique has been used to solve for u and v in terms of x and y, no explicit formulas are available for these relations. Formulas for the desired derivatives may still be obtained by implicit differentiation of the forward coordinate transformations:

$$x_x = 1 = x_u u_x + x_v v_x \tag{17A}$$

$$x_y = 0 = x_u u_y + x_v v_y \tag{17B}$$

$$y_x = 0 = y_u u_x + y_v v_x \tag{17C}$$

$$y_y = 1 = y_u u_y + y_v v_y \tag{17D}$$

wherein $x_x$ is the partial derivative of x with respect to x (identically equal to 1), etc. Since $x_u$, $x_v$, etc. are known (equations (16)), the above linear equations may be solved for $u_x$, $u_y$, etc., obtaining:

$$u_x = y_v/J \tag{18A}$$

$$u_y = -x_v/J \tag{18B}$$

$$v_x = -y_u/J \tag{18C}$$

$$u_x = x_u/J \tag{18D}$$

where J is the Jacobian determinant of the transformation, given by:

$$J = x_u y_v - x_v y_u. \tag{19}$$

The above equations [(16), (18) and (19)] provide complete formulas for $u_x$, $u_y$, etc. in terms of $x_u$, $x_v$, etc.

The foregoing transformations permit functions calculated in terms of u and v to be expressed in terms of cartesian coordinates, which is the preferred form for instructing numerically controlled machinery used in lens manufacture.

II. SURFACE DEFINITION

The total surface height or final surface function $Z_t$ may be defined as the sum of two terms:

$$Z_t = Z_d + Z \tag{20}$$

where $Z_d$ is the surface function of the distance zone and Z is the deviation or progressive addition function. The general relationship of these functions is shown in FIG. 5, in which the line $Z_t$ corresponds to a cross-section of the surface of the lens along a plane containing the y axis and perpendicular to the x axis.

The distance zone surface function $Z_d$ may be selected as a rotationally symmetric surface. The useful case of a spherical surface function $Z_d$ will now be considered. Such a function may be defined by an equation of the form $$Z_d = R_d - [R_d^2 - (x - \Delta_x)^2 - (y - \Delta_y)^2]^{\frac{1}{2}}. \tag{21}$$

where $R_d$ is the radius of curvature of the distance region prescribed for correction of distance viewing; and $\Delta_x$ and $\Delta_y$ are offsets of the vertex of the sphere to permit decentration of the sphere as desired.

The progressive function Z may be defined piecewise to reflect the different optical properties of the different lens regions as follows:

$$Z = 0 \text{ when } v > 0 \text{ (distance zone)} \tag{22A}$$

$$Z = U(u)S(y) \sum_{i=0}^{M} \sum_{j=0}^{N} A_{ij} u^i v^j \text{ when } 0 \geq v \geq -\lambda \text{ (intermediate zone)} \tag{22B}$$

$$Z = U(u)S(y)Z_s \text{ when } v < -\lambda \text{(near zone)} \tag{22C}$$

wherein $A_{ij}$ are coefficients to be determined from the optical specifications of the intermediate zone, M and N are the degrees of u and v, respectively, in the intermediate zone, and $Z_s$ is a near zone add function (a quartic surface of revolution) to be discussed below. The degrees M and N are to be kept as small as possible consistant with the optical specifications for the intermediate zone. In the embodiment of the invention discussed below M is equal to 8 and N is equal to 7. U(u) and S(y)
are auxiliary functions selected to help control astigmatism and orthoscopy in portions of the transition zone.

$Z_s$ is a near zone add function which is intended to have optical performance similar to a sphere to achieve the prescribed correction of near vision. To facilitate solution, a surface of revolution may be choosen of the following form:

$$Z_s = A_s[(x-x_o)^2+(y-y_o)^2]+B_s[(x-x_o)^2+(y-y_o)^2]^2 + z_o \tag{23}$$

where $A_s$ is a coefficient specifying the near zone curvature and thus its optical power; $B_s$ is a coefficient to allow for correction of the near zone to approximately a spherical shape $x_o$ and $y_o$ are the cartesian coordinates of the vertex (relative optical center) of the near zone; and $z_o$ is an additive constant to provide for surface height matching. The selection of $A_s$ and $B_s$ is discussed in greater detail in Section V below.

The remaining functions of equations (22) requiring definition are the auxiliary functions S(y) and U(u) which are applied to modify the preliminary surface function in selected regions.

The auxiliary function S(y) may be defined as:

$$S(y) = \exp[-(y-y_c)^3/\sigma_y^3] \; y > y_c \text{(selected region)} \tag{24A}$$

$$S(y) = 1 \; y \leq y_c \text{ (non-selected region)} \tag{24B}$$

where the parameter $\sigma_y$ determines the "strength" of the function and $y_c$ determines the boundary of the selected region. The auxiliary function U(u) may be defined by:

$$U(u) = \exp[-(u/\sigma_u)^4] \text{for all u} \tag{25}$$

where $\sigma_u$ defines the "strength" of the u auxiliary function. It will be understood that other expressions which are continuous through the third derivatives, may be employed as auxilliary functions. The use and effect of the auxiliary functions will be discussed in greater detail below.

III. BOUNDARY CONDITION SELECTION

In order to solve for the set of constants, $A_{ij}$, which define the intermediate zone, certain constrains are placed on the finished surface which will provide a useful surface and a sufficient number of simultaneous equations to permit solution. The choices presented here are the specification of conditions at the boundaries of the neighboring zones.

An advantageous selection of boundary conditions, which facilitates surface smoothness and optical continuity at the boundaries, is to require that (1) the surfaces of the zones be the same height at both boundaries; and (2) at least two, and preferably three, of the first partial derivatives with respect to v, be continuous at both boundaries.

These conditions are tantamount to requiring no surface jump discontinuities at the boundaries, no discontinuous changes in surface slope (no prism effect), no discontinuous curvature changes across the boundaries, and no discontinuous changes in the rate of change of curvature across the boundaries.

The boundary conditions can be expressed mathematically as:

| | Top Boundary | | |
|---|---|---|---|
| $Z = 0$ | at $v = 0$ | (26A) |
| $Z_v = 0$ | at $v = 0$ | (26B) |
| $Z_{vv} = 0$ | at $v = 0$ | (26C) |
| $Z_{vvv} = 0$ | at $v = 0$ | (26D) |
| | Bottom Boundary | | |
| $Z = Z_s$ | at $v = -\lambda$ | (27A) |
| $Z_v = Z_{sv}$ | at $v = -\lambda$ | (27B) |
| $Z_{vv} = Z_{svv}$ | at $v = -\lambda$ | (27C) |
| $Z_{vvv} = Z_{svvv}$ | at $v = -\lambda$ | (27D) | where the v subscripts indicate the order of the partial derivative with respect to v. It can be demonstrated that these boundary conditions can be expressed in terms of $A_{ij}$'s as follows:

Top Boundary
$$A_{i0} = 0 \quad (28A)$$
$$A_{i1} = 0 \quad (28B)$$
$$A_{i2} = 0 \quad (28C)$$
$$A_{i3} = 0 \quad (28D)$$
for $i = 0$ to 8,
Bottom Boundary
$$\sum_{j=0}^{N} A_{ij}(-\lambda)^j = B_{si} \quad (29A)$$

$$\sum_{j=0}^{N-1} A_{ij+1}(j+1)(-\lambda)^j = B'_{si} \quad (29B)$$

$$\sum_{j=0}^{N-2} A_{ij+2}(j+1)(j+2)(-\lambda)^j = B''_{si} \quad (29C)$$

$$\sum_{j=0}^{N-3} A_{ij+3}(j+1)(j+2)(j+3)(-\lambda)^j = B'''_{si} \quad (29D)$$

The second set of four equations also hold for i=0 to 8. The quantity N in the last four equations is the degree of the transition function Z in the variable v and may be at least 7, but can be larger.

The $B_{si}$'s are the coefficients of the one dimensional polynomial which gives the variation of $Z_s$ along the transition near zone boundary as a function of the variable u (note that the variable v does not appear since this boundary is defined by the condition $v = -\lambda$, a constant):

$$Z_s \mid_{v=\lambda} = \sum_{i=0}^{M} B_{si} u^i$$

The computation of the values of the $B_{si}$'s, $B'_{si}$'s, etc. is not feasible by using formal methods. Instead, a numerical approach may be used based on the following considerations. This polynomial can be found by substituting the transformation equations [2] into the cartesian definition of $Z_s$ (23). This gives $Z_s$ as a polynomial function of u and v rather than of x and y. The polynomial describing $Z_s$ along the boundary only is then obtained by setting $v = -\lambda$ and collecting terms on the power of u. The degree of this last polynomial can be inferred by noting that it is the result of substituting the transformation equations (2nd degree in u) into the defining expression for $Z_s$ (4th degree in x and y) resulting in a final expression of the 8th degree in u. Thus there are nine $B_{si}$'s to solve for. $B_{s0}$ is found as shown in section IV below. The rest are computed by evaluating the polynominal at eight points along the boundary, subtracting $B_{s0}$ from each value, and then solving numerically the system of eight linear equations resulting from the requirement that the polynomial take on the computed values at the given points. The same is done using the partial derivative $Z_{sv}$ instead of $Z_s$ to obtain the $B'_{si}$'s, etc.

IV. EYE PATH SPECIFICATION

An additional constraint placed on the system is the specification of the surface shape along the eye path. It can be demonstrated that the eye path shape depends solely on the $A_{0j}$'s. Thus, the eye path specification consists in preselecting the values of the $A_{0j}$'s. The selection may conveniently use either a cubic or quintic eye path. For a cubic eye path, the power changes linearly. For a quintic eye path, the power changes gradually and has a maximum rate of change near the midpoint of the eye path. In the quintic case, rate of change of power can be made continuous. In order to maintain consistency between the chosen number of derivatives to be matched on the boundaries and the eye path specification, a cubic eye path is used for second derivative boundary matching and a quintic eye path for third derivative boundary matching. Since the preferred embodiment thus far discussed requires third derivative boundary matching, the quintic eye path will be employed.

It is possible to solve numerically for the $A_{0j}$'s simultaneously with $x_0$, $y_0$ and $z_0$. The starting point are the boundary condition equations (28) and (29) given in the previous section for the special case with i=0.

$$A_{00} = 0 \quad (30A)$$
$$A_{01} = 0 \quad (30B)$$
$$A_{02} = 0 \quad (30C)$$
$$A_{03} = 0 \quad (30D)$$

$$\sum_{j=0}^{N} A_{0j}(-\lambda)^j = B_{s0} \quad (30E)$$

$$\sum_{j=0}^{N-1} A_{0j+1}(j+1)(-\lambda)^j = B'_{s0} \quad (30F)$$

$$\sum_{j=0}^{N-2} A_{0j+2}(j+1)(j+2)(-\lambda)^j = B''_{s0} \quad (30G)$$

$$\sum_{j=0}^{N-3} A_{0j+3}(j+1)(j+2)(j+3)(-\lambda)^j = B'''_{s0} \quad (30H)$$

The first four of these equations indicate that the first four $A_{0j}$'s must be zero to satisfy third derivative matching at the top boundary.

Setting N=7, the remaining equations can be written out explictly:

$$\lambda^4 A_{04} - \lambda^5 A_{05} + \lambda^6 A_{06} - \lambda^7 A_{07} = B_{s0} \quad (31A)$$

$$-4\lambda^3 A_{04} + 5\lambda^4 A_{05} - 6\lambda^5 A_{06} + 7\lambda^6 A_{07} = B'_{s0} \quad (31B)$$

$$12\lambda^2 A_{04} - 20\lambda^3 A_{05} + 30\lambda^4 A_{06} - 42\lambda^5 A_{07} = B''_{s0} \quad (31C)$$

$$-24\lambda A_{04} + 60\lambda^2 A_{05} - 120\lambda^3 A_{06} + 210\lambda^4 A_{07} = B'''_{s0} \quad (31D)$$

Recalling that $B_{s0}$, etc. are determined from the near zone surface function $Z_s$, we see that they are functions of $x_o$, $y_o$, and $z_o$. Since the latter are among the quantities to be determined, the system contains a total of four equations in seven unknowns. We thus have an underdetermined system of equations. In order to reduce the numbr of unknowns to four and thus obtain a uniquely determined solution, we first arbitrarily set $A_{06}$ and $A_{07}$ to zero. This gives an eye path shape of minimum degree, which is an arbitrary choice and others are possible. Other such choices might be used, e.g. to permit improved eyepath astigmatism or a modified eye-path power contour. However, the low astigmatism and satisfactory power contour obtained with $A_{06}$ and $A_{07}$ set equal to zero suggest that little is to be gained by such a procedure.

In order to reduce the total number of unknowns to four, as discussed above, a value of $x_o$ can be selected. The selection need not be arbitrary, since $x_o$ is the x coordinate of the near zone function center and we may anticipate the effects of positioning of the near zone function to affect the lens performance. For example, when designing decentered lenses it has not been surprising to find that $x_o$ must be offset somewhat for best performance. The designer will generally need to try a range of values of $x_o$, for example, to give a reasonably symmetric astigmatism pattern on either side of the near zone. Such a value would be expected to be between zero and the amount of decentration of the near zone. Once this value has been specified there remain only four unknowns to be solved for: $A_{04}$, $A_{05}$, $y_o$, and $z_o$. The four equations for these unknowns may now be written:

$$\lambda^4 A_{04} - \lambda^5 A_{05} = B_{s0} \tag{32A}$$

$$-4\lambda^3 A_{04} + 5\lambda^4 A_{05} = B'_{s0} \tag{32B}$$

$$12\lambda^2 A_{04} - 20\lambda^3 A_{05} = B''_{s0} \tag{32C}$$

$$-24\lambda A_{04} + 60\lambda^2 A_{05} = B'''_{s0} \tag{32D}$$

As noted above, $B_{s0}$ contains the unknowns $y_o$ and $z_o$, but the other three right hand sides contain only $y_o$. Thus the last three equations may be taken as three equations for the three unknowns $A_{04}$, $A_{05}$, and $y_o$. Because, $y_o$ is involved non-linearly on the right, it is convenient to solve the last three equations iteratively. In order to do this $A_{04}$ and $A_{05}$ are eliminated by solving equations (32C) and (32D) for them, obtaining:

$$A_{04} = (3B''_{s0} + \lambda B'''_{s0})/12\lambda^2 \tag{33A}$$

$$A_{05} = (2B''_{s0} + \lambda B'''_{s0})/20\lambda^3. \tag{33B}$$

Substituting these results into equation (32B), transposing $B'_{s0}$ to the left, clearing the numerical fractions, and re-arranging, yields:

$$12B'_{s0} + 6\lambda B''_{s0} + \lambda^2 B'''_{s0} = 0. \tag{34}$$

Recalling that all of the quantities on the left depend only on the unknown $y_o$, the equation may be written as:

$$f(y_o) = 0 \tag{35}$$

with $f(y_o)$ defined to be the expression on the left above. Even though the explicit form for $f(y_o)$ is unknown, the equation may be solved by the Newton-Raphson method. A useful initial guess for $y_o$ is $$y_o = -cx_o - (\lambda/2) + v_1. \tag{36}$$

Armed with a guess for $y_o$, corresponding estimates for $B'_{s0}$, etc. and, thus for $f(y_o)$, may be made. To estimate the derivative of $f(y_o)$ with respect to $y_o$, it is possible to increment the estimate for $y_o$ slightly, recompute $f(y_o)$, and compute the difference quotient. A new estimate for $y_o$ is then obtained by the Newton-Raphson method and the process is repeated until the change in $y_o$ becomes sufficiently small (e.g. less than 1 micron).

Using the values of $B'_{s0}$, etc. resulting from the final loop, $A_{04}$ and $A_{05}$ may be computed by the formulas (33) above. $z_o$ may then be computed from the equation:

$$B_{s0} = A_s[(x-x_o)^2 + (y-y_o)^2] + B_s[(x-x_o)^2 + (y-y_o)^2]^2 + z_o. \tag{37}$$

Evaluated at $u = 0$, $v = -\lambda$.

V. SELECTION OF NEAR ZONE FUNCTION PARAMETERS

In Section II, a definition was given of the function $Z_s$ (equation (23)) and it was noted that the coefficient $A_s$ largely determines the near zone power. However, the parameter $B_s$ appears as well. These two coefficients may be determined together to produce a near zone which not only has the desired power, but which also maintains this power within reasonable limits over its area and which has acceptably low astigmatism. These requirements are equivalent to requiring that the near zone be nearly spherical. The introduction of the quartic term into the near zone surface function is intended to permit an approximation to this condition. The choice of values for the near zone surface function parameters $x_o$, $y_o$, and $z_o$ has already been discussed in section IV.

In order to design the near zone one may estimate $A_s$ and $B_s$ by considering the requirement that the total surface function $Z_t$ in the near zone be the sum of two terms:

$$Z_t = Z + Z_d$$

where, as before, $Z_d$ is the distance sphere function. The requirement is imposed that $Z_t$ must be nearly spherical in the near zone. By expanding $Z_d$ in a Taylor series, adding to $Z_s$ and comparing the result term by term to a Taylor series for a sphere of the desired total curvature of the near zone, estimates for $A_s$ and $B_s$ are obtained:

$$A_s \approx (\tfrac{1}{2})[(1/R_s) - (1/R_d)] \tag{38A}$$

$$B_s \approx (\tfrac{1}{8})[(1/R_s^3) - (1/R_d^3)] \tag{38B}$$

where $R_s$ and $R_d$ are the total radii of curvature of the near zone and distance zone respectively. Note that $R_s$ will always be less than $R_d$. These estimates are made neglecting the fact that the distance sphere and the near zone function are not defined with respect to the same origin (the near zone function is defined with respect to an origin at $(x_o, y_o)$ and the distance sphere is centered at $(\Delta_x, \Delta_y)$). As a result, the above estimate for $B_s$ will generally be too small. It is convenient to multiply by an additional factor of 1.5 to 2 to obtain a more usable value.

In order to improve these estimates, a simple iterative procedure may be used. The procedure begins by evaluating the optical performance (astigmatism and mean power variation) in the near zone when the above estimates are used for $A_s$ and $B_s$. The power and astigmatism should be checked at the nominal measurement point (e.g. 14 mm. below geometrical center) and at at least two additional points further down in the near zone. If, for example, the astigmatism axis in the lower near zone is at or near 90 degrees then the power there is stronger in the transverse direction than in the vertical direction. ("Astigmatism axis" indicates the angular direction of the normal plane in which the curvature is greatest, the y axis corresponding to an angle of 90°, the angle increasing in a counterclockwise direction). In order to correct this, $B_s$ must be increased, since the vertical power will generally be much more sensitive to the value of $B_s$ than the transverse power. By repeating the procedure as necessary, acceptable vertical and transverse power matching can be obtained. Once this has been accomplished, the power variation along the near zone center line should be checked. If, for example, the power is found to drop off as one moves down the near zone, then the values of both $A_s$ and $B_s$ will have to be adjusted. In this case $A_s$ should be decreased slightly and $B_s$ increased to bring the power at the measurement reference point (14 mm. below center) back to nominal. The power and astigmatism at the points lower down should then be checked again and the astigmatism returned to acceptable levels as described above. By systematic repetition of this procedure, it is possible to achieve satisfactory astigmatism and power variation along with correct power at the measurement point, typically within 0.05 diopters.

VI. FORMULATION AND SOLUTION OF SIMULTANEOUS EQUATIONS

Referring back to the boundary conditions (28) and (29), it may be noted that the right-hand sides of these equations are now effectively known, since $x_o$, $y_o$, and $z_o$ have been determined as shown in section IV., and these quantities determine the near zero surface function $Z_s$, which, in turn, determines $B_{si}$, etc. The system is then solved numerically by computer using a conventional method of solving simultaneous linear equations.

In alternative embodiments of the present invention, some $A_{ij}$'s could be prespecified. It will be appreciated that additional $A_{ij}$'s must be introduced (such as $A_{i8}$ or $A_{i9}$) so that a unique solution for the system will exist. The selection of the $A_{ij}$'s to prespecifiy will depend on the design problems to be solved and on an appreciation that the $A_{ij}$ are more or less dominant in different locations of the lens depending on the power and sign of the variables u and v with which they are associated. Useful modifications of the lens may be made without undue experimentation.

VII. PRESENTATION OF EXEMPLARY VALUES OF CALCULATED CONSTANTS

Since some of the $A_{ij}$'s have been computed numerically in this preferred embodiment, no closed form formulas are derived for these constants. The following table presents exemplary values for the $A_{ij}$'s based on the following design parameters:

| Lens geometry | Coordinate System Parameters |
|---|---|
| $w_s$ = 25.00 mm | a = .0044661 mm$^{-2}$ |
| $y_s$ = −25.00 mm | c = 0.000000 |
| $\theta_s$ = 0.00° | $v_0$ = .100E + 04 mm |
| $w_d$ = 50.00 mm | $v_1$ = 5.2753 mm |
| $y_d$ = 20.00 mm | $\lambda$ = 20.0000 mm |
| $\theta_d$ = 0.00° | $\Delta_x$ = 0.00 mm |
|  | $\Delta_y$ = 0.00 mm |

| Base Curve Parameters | |
|---|---|
| $R_D$ = 94.812 mm | |

| Near Zone Function Parameters | Auxiliary Function Parameters |
|---|---|
| $A_S$ = .16500E-02 mm$^{-1}$ | $\sigma_y$ = 60.00 mm |

| -continued | |
|---|---|
| $B_S$ = .25000E-06 mm$^{-3}$ | $y_c$ = −30.00 mm |
| $X_0$ = 0.0000 mm | $\sigma_u$ = 40.00 mm |
| $y_0$ = −4.7247 mm | |
| $z_0$ = .0325 mm | |

TABLE I

The $A_{ij}$'s:

| |
|---|
| A(0,3) = .0000000E+01 |
| A(0,4) = .2000000E−05 |
| A(0,5) = .3750000E−07 |
| A(1,4) = .5604961E−11 |
| A(1,5) = .7286451E−12 |
| A(1,6) = .3176146E−13 |
| A(1,7) = .4670802E−15 |
| A(2,4) = .3355189E−06 |
| A(2,5) = .3712679E−07 |
| A(2,6) = .1502216E−08 |
| A(2,7) = .2115878E−10 |
| A(3,4) = −.2943542E−12 |
| A(3,5) = −.3808609E−13 |
| A(3,6) = −.1660251E−14 |
| A(3,7) = −.2445884E−16 |
| A(4,4) = .2006494E−09 |
| A(4,5) = .1365106E−10 |
| A(4,6) = .4054635E−12 |
| A(4,7) = .4436148E−14 |
| A(5,4) = .2613773E−14 |
| A(5,5) = .3370562E−15 |
| A(5,6) = .1464950E−16 |
| A(5,7) = .2153277E−18 |
| A(6,4) = .2392294E−13 |
| A(6,5) = .7413615E−15 |
| A(6,6) = .8047403E−16 |
| A(6,7) = .1249713E−17 |
| A(7,4) = −.5962881E−17 |
| A(7,5) = −.7683208E−18 |
| A(7,6) = −.3336166E−19 |
| A(7,7) = −.4899741E−21 |
| A(8,4) = −.3356843E−16 |
| A(8,5) = −.4276763E−17 |
| A(8,6) = −.6130147E−19 |
| A(8,7) = −.2222226E−21 |

All other $A_{ij}$'s=0. The dimensions of the $A_{ij}$ constants are the reciprocal of millimeters to the power (i+j−1).

An important goal of the design is achieved when the $A_{ij}$'s have been determined. Once these coefficients are in hand, a final surface function may be generated by evaluation of the polynomial formula on a grid of points, multiplication by the auxiliary functions and addition to the base surface function. The final surface function is progenitive of a lens formed as discussed below. An array of surface heights from the x,y plane are presented in FIG. 6 for the progressive surface of Table I.

VIII. COMPUTATION OF THE NORMAL VECTOR

The mechanisms for computing the coefficients describing the surface height function have been described. In order to manufacture a lens, or to evaluate its optical performance, it is useful to calculate the unit normal vector anywhere on its surface.

The partial derivatives necessary to compute the normal vector can be computed from the explicit form of $Z_t$. Recall $$Z_t(x,y) = Z_d(x,y) + Z(x,y) \tag{39}$$

This implies $$Z_{tx} = Z_{dx} + Z_x \quad (40)$$

and $$Z_{ty} = Z_{dy} + Z_y \quad (41)$$

where $Z_{dx}$ etc. are partial derivatives. The choice of a final surface function as the simple sum of a distance sphere and an add function has this important benefit: it permits simple computation of the partial derivatives needed to compute the normal.

The partial derivatives of the distance sphere $Z_d$ (defined in eq. (21)) with respect to x and y are:

$$Z_{dx} = (x - \Delta_x)/[R_d^2 - (x - \Delta_x)^2 - (y - \Delta_y)^2]^{\frac{1}{2}} = (x - \Delta_x)/(R_d - Z_d) \quad (42A)$$

$$Z_{dy} = (y - \Delta_y)/[R_d^2 - (x - \Delta_x)^2 - (y - \Delta_y)^2]^{\frac{1}{2}} = (y - \Delta_y)/(R_d - Z_d). \quad (42B)$$

As before, these must be added to $Z_x$ and $Z_y$, computed below, to obtain the total surface height derivatives $Z_{tx}$ and $Z_{ty}$. The partial derivatives of Z are now obtained. In the distance zone this is trivial since Z is defined to be zero there, and so all of its derivatives are also zero.

In the transition zone, recall that $$Z = U(u)S(y)Z_p \quad (43)$$

where $Z_p$ is the polynomial factor of the surface function. Differentiating and simplifying, yields:

$$Z_x = U(u)_x S(y) Z_p + U(u) S(y) Z_{px} \quad (44A)$$

$$Z_y = U(u)_y S(y) Z_p + U(u) S'(y) Z_p + U(u) S(y) Z_{py}. \quad (44B)$$

where $S'(y)$ (defined equal to $S(y)_y$) is as given by:

$$S'(y) = -3[(y - y_c)^2/\sigma_y^3]S(y). \quad (45)$$

Using the notation $U(u)_u = U'(u)$, $U(u)_x$ and $U(u)_y$ may be evaluated as follows:

$$U(u)_x = U'(u)u_x \quad (46A)$$

$$U(u)_y = U'(u)u_y \quad (46B)$$

$Z_{px}$, $Z_{py}$, $u_x$ and $u_y$ are easily obtained, and $U'(u)$ is explicitly:

$$U'(u) = -(4u^3/\sigma_u^4)U(u). \quad (47)$$

These expressions permit $Z_x$ and $Z_y$ to be found and the normal vector obtained therefrom.

In the near zone, the procedure is the same, except that derivatives of the near zone function $Z_s$ are required. Those derivatives are as follows:

$$Z_{sx} = 2\{A_s + 2B_s[(x - x_0)^2 + (y - y_0)^2]\}(x - x_0) \quad (48A)$$

$$Z_{sy} = 2\{A_s + 2B_s[(x - x_0)^2 + (y - y_0)^2]\}(y - y_0) \quad (48B)$$

The derivatives of Z in the near zone are computed identically to those in the intermediate zone, but with $Z_s$, $Z_{sx}$, $Z_{sy}$ substituted for $Z_p$, $Z_{px}$, $Z_{py}$ respectively.

For these derivatives the normal vector can be calculated in a conventional manner, and the calculated normal vector used to position a cutting head used in the manufacturing processes discussed below.

IX. EVALUATION OF LENSES

Figure 7A:
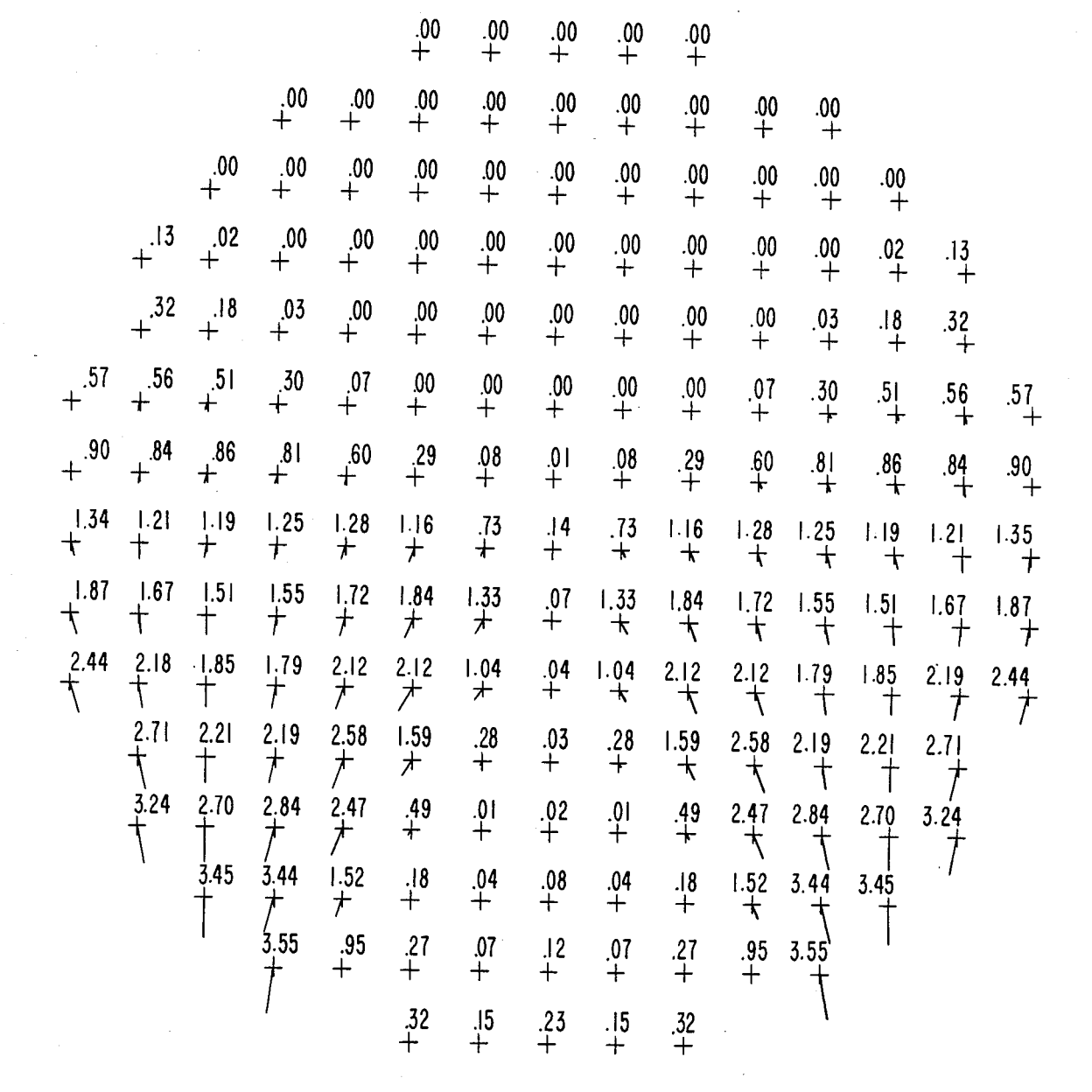

The astigmatism and mean power of a progressive surface such as that indicated in FIG. 6 can be predicted. The results of these predictions are shown in FIGS. 7a and 7b for an array of points corresponding to the points of FIG. 6. In the FIG. 7a the numerical values indicate the magnitude of the astigmatism and the directions of the line segments indicate the directions of the astigmatism axis.

Astigmatism diagrams of the type of FIG. 7a are useful in evaluating lens designs. The progressive surface presented in the Figures has a large window of nearly zero astigmatism (0.5 diopters or less) corresponding to the distance zone. Likewise astigmatism is minimized in the near zone and in a wide corridor centered on the eye path. At the same time, low levels of astigmatism are achieved in other areas of the intermediate zone.

In FIG. 7b, mean power values (with base power subtracted) for the progressive surface of FIG. 6 are presented for the array of points. Such diagrams are useful in evaluating the lens design. Advantageously, powers in such diagrams should be nearly zero in a large distance zone, and nearly equal to the nominal add power in the near zone. A smooth transition in powers should occur in a wide corridor centered on the eye path.

X. MANUFACTURE OF LENSES AND ASSOCIATED TOOLINGS

The manifacture of progressive lenses is carried out by using the final surface function derived above to provide height values for a multiplicity of points, e.g., at 1 millimeter centers, and then, by means of a numerically controlled milling machine, producing a porous ceramic former with a surface configured to correspond to the aformentioned height values. It is usually unnecessary to generate the height values outside the milling machine system because such machines often have associated computers which can solve the necessary expressions and then carry out the evaluations for each point once fed the parameters of the final surface function.

The porous ceramic former, thus prepared, can then be used in a conventional manner to form a progressive surface of a glass lens or lens blank by sag forming techniques. The porous former can also be used to form a mold part, which can then be used to form the progressive surface in a cast lens in a conventional lens casting process. Techniques of using such formers are described in, for example, U.S. Pat. No. 4,062,629 to Winthrop (see columns 14 and 19.)

It will be apparent that, because of the inherent limitations of the milling procedure and the need to then carry out one or more steps before achieving the desired progressive lens surface on a lens or lens blank, the progressive lens surface obtained cannot match in a mathematically exact manner the expressions used to generate the instructions for the milling machine. Another inaccuracy inherently induced in the process is caused by the fact that the milling machines necessarily employ a finite size of grid. The correspondence between the final surface function and the manufactured surfaces will vary slightly as one moves from former to lens or from former to mold to lens. However, it has been found in practice that variations so introduced are limited and do not result in a lens whose performance characteristics are unpredictable. The lens former is, of course, the tangible article whose form will most closely correspond to the final surface function.

A full disclosure of the surface height points generated for the milling operation would involve, typically, for one-half of a symmetric lens design, from three to four thousand points with their associated x and y coordinates and, in fact, are not usually printed out by the machine because such a printout is normally of no consequence in the procedure. However, in following the conventions adopted by previous disclosures in the field, FIG. 6 shows an array of surface heights at a limited number of points for a progressive surface. The heights are specified to three significant figures. The limits of the ability of any particular milling machine available at the date of this application to reproduce such heights faithfully would require specification to four significant figures in millimeters or five significant figures in inches. It should also be understood that such data can be calculated to the desired degree of accuracy through a straightforward application of the formulae and constants given herein.

With reference now to FIG. 8, the overall procedures which may be employed in a preferred embodiment of the present invention to produce a lens will be discussed. The process of making the lens begins with the selection of base surface parameters $R_d$, $\Delta_x$, and $\Delta_y$. These parameters correspond, respectively, to the radius of curvature of the distance zone (or base curve) and the offsets of the vertex of the distance sphere from the origin of the Cartesian coordinate system. Typically, $\Delta_x$ and $\Delta_y$ are selected such that the distance sphere vertex will lie somewhere in the progressive corridor of the finished lens. The parameters $A_s$, $B_s$ and $X_o$, which define the near zone, are then selected. From this group of selected parameters, the near zone surface function $Z_s$ may then be calculated. Power and astigmatism diagrams may then be generated for the near zone, for example, by conventional methods such as a computer ray trace. These diagrams may then be used to evaluate the near zone surface. Such evaluation may include determining whether the near zone add power is correct, and determining whether the departures of the near zone from sphericity are acceptable.

Following the generation of an acceptable near zone surface function, the boundary geometry parameters are selected: i.e., $w_s$, $y_s$, $\theta_s$, $w_d$, $y_d$, $\theta_d$ and p. From this information the preliminary $A_{ij}$'s may be calculated. In turn, the preliminary intermediate zone function $Z_p$ may be calculated. As before, power and astigmatism diagrams may be generated in the conventional manner, which permit evaluation of the intermediate zone surface. As described above, the surface may be evaluated and, if necessary, changes made in the boundary geometry parameters originally selected; and the procedure repeated until an acceptable intermediate zone surface is obtained. At this point the location of the vertex of the distance sphere may be determined, and repositioned as necessary by adjustments in the values $\Delta_x$ and $\Delta_y$. Such a readjustment may require a return to the first step, in exceptional circumstances.

Once the preliminary intermediate zone surface function $Z_p$ has been determined, the auxiliary function parameters for U(u) and S(y) may be selected. The auxiliary functions are used to calculate the final surface function $Z_t$ in the manner described above. Once again, power and astigmatism diagrams may be generated, this time for the entire surface function $Z_t$. The final surface function may then be evaluated, to determine, inter alia, that the auxiliary functions are providing the localized effect desired and that they are not adversely affecting desirable characteristics already established in the preliminary surface function. As necessary, alterations may be made in the selection of the auxiliary function parameters and the final surface function recomputed until a satisfactory result is achieved.

The final surface function is then supplied to a numerically controlled milling machine for the machining of a porous ceramic former. The porous ceramic former may be either concave or convex in configuration depending on the particular process employed in producing the final lens.

The various processes for producing the final lens will now be described in greater detail in connection with FIGS. 9a and 9c.

Figure 9A:
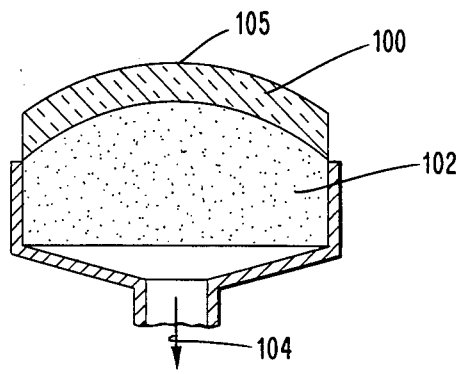
FIGS. 9a-c are cross-sectional views of lens molding and forming assemblies illustrating methods for making lenses.

FIG. 9a illustrates in cross-section the formation of a glass lens blank 100 on a ceramic porous former 102. In this process a surface of the ceramic former 102 is exposed to a vacuum indicated schematically by the arrow 104. A polished glass blank, typically of uniform thickness, is placed on top of the former 102 and the assembly placed inside an oven capable of raising the temperature of the blank 100 to above the softening point of the glass. It will be understood that the effects of the temperature and vacuum will be such to cause the lens blank to conform to the shape of the former 102. The upper surface 105 of the formed blank 100 will be a replica of the progressive surface of the porous former, it being understood that the smoothness of this surface will not be compromised during the formation process. It will also be observed that certain systematic deviations from the final surface function will be introduced in the glass blank as a result of the sagging process, due to the fact that the progressive surface is not constrained to conform exactly to the porous former surface and is not in contact with the porous former surface. The final surface function may be precompensated for this effect in a manner that will be readily understood by references to FIG. 9c. This compensation scheme relies on the assumption that a radius of curvature "f" on the lens blank surface will differ approximately by the glass thickness "g", from the corresponding radius of curvature "h" of the progressive former surface. Thus, for example, the distance "g" could be subtracted from the desired distance zone radius $R_d$ for the lens.

Figure 9B:
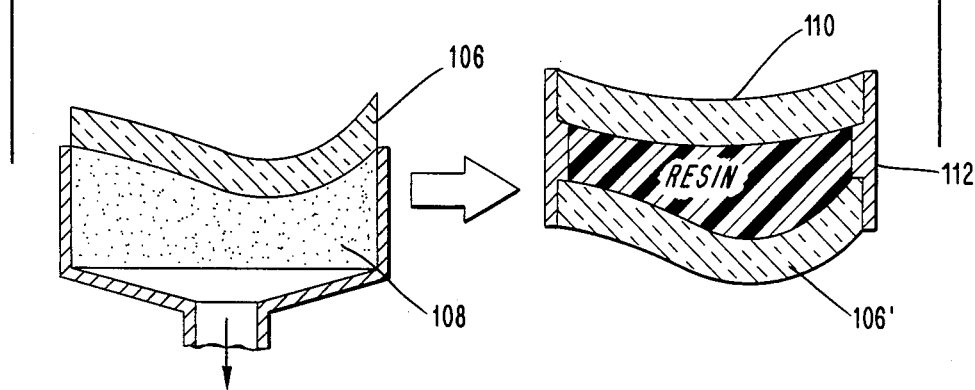
Figure 9C:
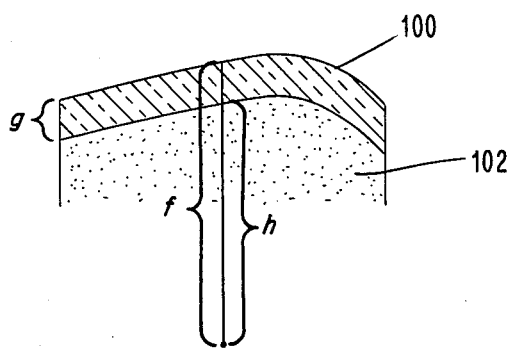

In FIG. 9b a process for molding a plastic lens is illustrated. In the process of FIG. 9b, a glass mold blank 106 is sagged into a concave porous former 108 similar to the former described in connection with FIG. 9a. The progressive mold part 106 is then located in spaced relationship to a generally spherically curved glass mold part 110. The two mold parts are placed in contact with a gasket 112 and held in spaced relation to one another. Liquid resin is introduced into the mold and the resin is cured. The semi-finished lens blank is removed from the mold assembly after cure.

Although the foregoing invention has been described in connection with preferred embodiments, it is to be understood that variations and modifications may be resorted to as will be apparent to those skilled in the art. Such variations and modifications are to be considered within the purview and the scope of the claims appended hereto.

We claim:

1. A method for making an optical body having a distance viewing zone, a near viewing zone, and an intermediate zone in which there is a gradual change in optical power from the distance zone to the near zone, comprising the steps of:

selecting a base surface function $Z_d$ progenitive of prescribed optical properties in the distance zone;

selecting a deviation function Z representative in value of a deviation from the base surface in the intermediate zone, said deviation function having a zero value in the distance zone and having a value in the intermediate zone given by a polynomial function in a two dimensional curvilinear coordinate system (u,v), boundaries of the zones in the coordinate system being defined so that, along the eye path, u equals a constant, and so that, along a distance zone boundary and a near zone boundary, v equals a constant; and forming a lens surface in the optical body responsive to a surface function $Z_T$ where $$Z_T = Z_d + Z.$$

2. The method of claim 1 wherein the polynomial function is defined by an equation of the form:

$$Z = \sum_{i=0}^{n} \sum_{j=0}^{m} A_{ij} u^i v^j$$

where n and m are degrees of u and v, respectively; where $A_{ij}$ is a set of constants; and where $u^i$ and $v^j$ are the coordinates of the curvilinear coordinate system, raised to the ith and jth power, respectively.

3. The method of claim 2 wherein n and m are each integers less than or equal to 8.

4. The method of claim 3 wherein u and v are defined such that the cartesian coordinates x and y are given by transformation equations of the form:

$$x = \sum_{i=0}^{p} \sum_{j=0}^{q} X_{ij} u^i v^j, \text{ and}$$

$$y = \sum_{i=0}^{r} \sum_{j=0}^{s} Y_{ij} u^i v^j$$

where p and q are degrees of u and v defining x, where r and s are degrees of u and v defining y; and where $X_{ij}$ and $Y_{ij}$ are sets of constants.

5. The method of claim 4 wherein p, q, r and s are each integers less than or equal to 2.

6. A multifocal, progressive lens with a lens surface having a near viewing zone, a distance viewing zone, and an intermediate zone in which there is a gradual change in optical power along an eye path from the distance zone to the near zone; wherein boundaries between the distance zone and the intermediate zone, and between the intermediate zone and near zone are substantially projections of algebraic curves on the lens surface; and wherein the shape of the surface of the lens is substantially defined by a final surface function such that the surfaces of the zones are the same height at the boundaries and so that at least the first three derivatives of the final surface function are continuous across the boundaries, wherein the function is defined by an equation of the form:

$$Z_T = Z_d + Z$$

wherein $Z_T$ is the final surface function, $Z_d$ is the surface of the distance zone extended over the entire optical body and Z is defined in the intermediate zone by an equation of the form:

$$Z = \sum_{i=0}^{n} \sum_{j=0}^{m} A_{ij} u^i v^j$$

where n and m are integers less than 10, where $A_{ij}$ are a set of constants and where $u^i$ and $v^j$ are coordinates of a curvilinear coordinate system, raised to the ith and jth power, respectively, u and v being defined such that the cartesian coordinates x and y are given by transformation equations of the form:

$$x = \sum_{i=0}^{p} \sum_{j=0}^{q} X_{ij} u^i v^j, \text{ and}$$

$$y = \sum_{i=0}^{r} \sum_{j=0}^{s} Y_{ij} u^i v^j$$

where p, q, r and s are each integers less than or equal to 2; and where $X_{ij}$ and $Y_{ij}$ are further sets of constants, and, wherein, a near zone portion of the function Z is a polynomial function in the cartesian coordinates x and y.

7. The lens of claim 6 wherein the surface of the distance zone is rotationally symmetric about an axis substantially perpendicular to an x-y plane of the cartesian coordinates x and y.

8. The lens of claim 7 wherein the rotationally symmetric surface of the distance zone is spherical.

9. The lens of claim 8 wherein the vertex of the distance zone is located at the approximate center of the lens.

10. The lens of claim 6 wherein both the algebraic curves are parabolas.

11. The lens of claim 6 wherein $$Z = 0$$

in the distance zone.

12. The lens of claim 6 wherein the transformation equations are given by:

$$x = (c/v_o)(v + v_1)(v_o - v_1 - v)(au^2 + 1) + u$$

$$y = (v + v_1)(au^2 + 1)$$

wherein a, c, $v_o$ and $v_1$ are constants.

13. The lens of claim 12 wherein the curve $$u = 0$$

is the eye path; the curve $$v = 0$$

is the boundary between the distance and the intermediate zones; $v_o$ and c are parameters which determine a nasal offset of the near zone boundary; and the constant, a, determines the curvatures of the boundaries.

14. The lens of claim 13 wherein:
a is from 0 to 1 mm$^{-2}$;
c is from $-1$ to 1;
$v_o$ is greater than 1 mm; and
$v_1$ is from $-100$ to 100 mm.

15. The lens of claim 6 wherein the final surface function is the sum of the function $Z_d$ and the function Z which is the product of a preliminary function and an auxiliary function.

16. The lens of claim 15 wherein the function $Z_d$ is a surface of the distance zone extended over the entire lens, said surface being rotationally symmetric about an axis substantially perpendicular to an x-y plane of the cartesian coordinates x and y.

17. The lens of claim 15 wherein the preliminary function is selected so that the surfaces of the zones are the same height at the boundaries and so that at least the first three derivatives of the preliminary function are continuous across the boundaries.

18. The lens of claim 15 wherein the auxiliary function is continuous in all derivatives up to and including the third.

19. The lens of claim 15 wherein the auxiliary function distributes, in a predetermined fashion, astigmatism correction in the intermediate zone.

20. The lens of claim 19 wherein the auxiliary function is a function S(y) given by an equation of the form:

$$S(y) = e - (y - y_c/\sigma_y)^3 \quad y > y_c$$
$$S(y) = 1 \quad y \leq y_c$$

where $Y_c$ and $\sigma_y$ are constants.

21. The lens of claim 15 wherein the auxiliary function distributes, in a predetermined fashion, orthoscopic correction in the intermediate zone.

22. The lens of claim 21 wherein the auxiliary function is a function U(u) given by an equation of the form:

$$U(u) = e^{-(u/\sigma_u)^4}$$

for all u, where $\sigma_u$ is a constant.

23. The lens of claim 6 wherein the surface of the near zone is defined by an equation of the form:

$$Z_T = Z_d + Z_s$$

where $Z_T$ is the final function, $Z_d$ is the rotationally symmetric surface of the distance zone extended over the entire lens, and $Z_s$ is a near zone surface function given by an equation of the form:

$$Z_s = A_s[(x-x_0)^2 + (y-y_0)^2] + B_s[(x-x_0)^2 + (y-y_0)^2]^2 + z_0$$

where $A_s$, $B_s$, $x_0$, $y_0$ and $z_0$ are constants.

24. A multifocal, progressive lens with a lens surface having a near viewing zone, a distance viewing zone which is rotationally symmetric, and an intermediate zone in which there is a gradual change in optical power along an eye path from the distance zone to the near zone; wherein boundaries defined between the distance zone and the intermediate zone, and between the intermediate zone and near zone are substantially projections of algebraic curves on the lens surface; and wherein the shape of the surface of the lens is substantially defined by a final surface function such that the surfaces of the zones are the same height at the boundaries and so that at least the first three derivatives of the final surface function are continuous across the boundaries, wherein the surface of the near zone is defined by an equation of the form $Z_T = Z_d + Z_s$ where $Z_T$ is the final function, $Z_d$ is the surface of the distance zone extended over the entire lens and $Z_s$ is a near zone surface function having a factor given by a fourth degree expression in the cartesian coordinates x and y.

25. The lens of claim 24 wherein the factor is given by an expression of the form $$A_s[(x-x_0)^2 + (y-y_0)^2] + B_s[(x-x_0)^2 + (y-y_0)^2]^2 + z_0$$

wherein $A_s$, $B_s$, $x_0$, $y_0$ and $z_0$ are constants.

26. A former for a multifocal, progressive lens with a progressive surface progenitive of a near viewing zone, a distance viewing zone which is rotationally symmetric, and an intermediate zone in which there is a gradual change in optical power along an eye path from the distance zone to the near zone; wherein boundaries are defined between the distance zone and the intermediate zone, and between the intermediate zone and near zone which are projections of algebraic curves on the surface; and wherein the shape of the surface is defined by a final surface function such that the surfaces of the zones are the same height along both of the boundaries and so that at least the first three derivatives of the final surface function are continuous across both of the boundaries.

27. The former of claim 26 wherein the surface is defined in the three zones by the function $Z_T$ given by an equation of the form:

$$Z_T = Z_d + Z$$

wherein $Z_d$ is a function defining a surface which provides prescribed optical properties in the distance zone, and Z is a deviation function representative in value of a deviation from $Z_d$, said deviation function having a zero value in the distance zone and non-zero values in the near and intermediate zones.

28. The former of claim 27 wherein a factor of the function Z in the intermediate zone is defined by an expression of the form:

$$\sum_{i=0}^{n} \sum_{j=0}^{m} A_{ij} u^i v^j$$

where n and m are each integers less than or equal to 8, where $A_{ij}$ is a set of constants and where $u^i$ and $v_j$ are coordinates of a curvilinear coordinate system, raised to the ith and jth power, respectively, u and v being defined such that the cartesian coordinates x and y are given by transformation equations of the form:

$$x = \sum_{i=0}^{p} \sum_{j=0}^{q} X_{ij} u^i v^j, \text{ and}$$

$$y = \sum_{i=0}^{r} \sum_{j=0}^{s} Y_{ij} u^i v^j$$

where p, q, r and s are each integers less than or equal to 2, and where $X_{ij}$ and $Y_{ij}$ are further sets of constants.

29. The former of claim 28 wherein the transformation equations are given by:

$$x = (c/v_0)(v+v_1)(v_0-v_1-v)(au^2+1)+u$$

$$y = (v+v_1)(au^2+1)$$

wherein a, c, $v_0$ and $v_1$ are constants.

30. The former of claim 29 wherein the curve $u=0$ is the eye path; the curve $v=0$ is the boundary between the distance and the intermediate zones; $v_o$ and c are parameters which determine a nasal offset of the near zone boundary; and the constant, a, determines the curvatures of the boundaries.

31. The former of claim 30 wherein:
   a is from 0 to 1 mm$^{-2}$;
   c is from $-1$ to 1;
   $v_o$ is greater than 1 mm; and
   $v_1$ is from $-100$ to 100 mm.

32. The former of claim 30 wherein the surface height along the eye path is substantially determined by a function of the fifth degree of v.

33. A method for making lens having a distance viewing zone, a near viewing zone and an intermediate zone lying between boundaries with the distance and near zones, in which, in the intermediate zone, there is a gradual change in optical power along an eye path from the distance zone to the near zone, comprising the steps of:
   (a) selecting a base surface defined by a mathematical function which provides prescribed optical properties in the distance zone;
   (b) selecting a two-dimensional curvilinear coordinate system (u, v) in which the eye path is defined by the limitation that along the eye path, u equals a constant and in which the distance zone boundary and the near zone boundary are defined by the limitation, v equals a constant;
   (c) defining a near zone add surface function, which when summed with the base surface function will define a surface approximating the prescribed optical properties in the near zone;
   (d) deriving a preliminary polynomial function in the coordinate system such that the preliminary function defines a surface for the intermediate zone so that the surfaces of the zones are the same height at the boundaries and so that at least the first two partial derivatives with respect to the surface functions in the three zones are the same at the boundaries;
   (e) choosing an auxiliary function;
   (f) obtaining the product of the add surface function and the auxiliary function in the near zone;
   (g) obtaining the product of the preliminary function and the same auxiliary function in the intermediate zone;
   (h) adding the base surface function to the products of steps (f) and (g) in their respective zones to provide final surface functions defining the surface of the near zone and intermediate zone, respectively; and
   (i) forming the optical body with a surface substantially characterized, in the distance zone by the base surface function and, in the intermediate and near zones, by the final surface functions.

34. The method of claim 33 wherein the boundaries are defined as projections of parabolas on a surface of the optical body.

35. The method of claim 34 wherein the near zone add surface function $Z_s$ is given by an equation of the form $$Z_s = A_s[(x-x_0)^2 + (y-y_0)^2] + B_s[(x-x_0)^2 + (y-y_0)^2]^2 + z_0$$

where $A_s$, $B_s$, $x_o$, $y_o$ and $z_o$ are constants.

36. The method of claim 33 wherein the auxiliary function is chosen to reduce astigmatism in at least a portion of the intermediate zone.

37. The method of claim 33 wherein the auxiliary function is chosen to improve orthoscopy in at least a portion of the intermediate zone.

38. The method of claim 33 wherein the auxilliary function is, itself, the product of a function S(y) selected to reduce astigmatism in at least a portion of the intermediate zone, and a function U(u) selected to improve orthoscopy in at least a portion of the intermediate zone.

39. The method of claim 33 further comprising the step of using said optical body to profile a former for further formation of such optical bodies.

40. A method for making an optical body having a distance viewing zone, a near viewing zone and an intermediate zone lying between boundaries with the distance and near zone, in which intermediate zone there is a gradual change in optical power along an eye path from the distance zone to the near zone, comprising the steps of:
   (a) selecting a rotationally symmetric base surface defined by a mathematical function which provides prescribed optical properties in the distance zone;
   (b) selecting a two dimensional coordinate system (u, v) in which, along the eye path, u equals a constant, and in which, along boundaries between the zones, v equals a constant;
   (c) defining a near zone add surface function, which, when summed with the base surface function, defines a surface approximating the prescribed optical properties in the near zone;
   (d) deriving a preliminary polynomial function in the coordinate system defining a surface for the intermediate zone such that the surfaces of the zones are the same height at the boundaries and such that at least the first three partial derivatives with respect to the surface functions in the three zones are the same at the boundaries;
   (e) adding the base surface function to the functions obtained in steps (c) and (d) in their respective zones to provide preliminary surface functions defining the surfaces of the near zones and intermediate zone, respectively;
   (f) evaluating the optical properties of the surface defined by the functions obtained in steps (a) and (e);
   (g) modifying the shape of the zone boundaries;
   (h) repeating steps (b) through (e) to obtain final surface functions; and
   (i) forming the optical body responsive to said final surface functions.

41. The method of claim 40 further comprising the step of:
   (j) using said optical body to profile a former for further formation of such optical bodies.

42. A method for making a lens having a distance viewing zone, a near viewing zone and an intermediate zone lying between boundaries with the distance and near zones, in which intermediate zone, there is a gradual change in optical power along an eye path from the distance zone to the near zone, comprising the steps of (a) selecting a preliminary surface function, defined piece-wise as zero in the distance zone, a polynomial function in the intermediate zone and a quartic surface in the near zone;
(b) selecting an auxiliary surface function continuous in all derivatives up to and including the third;
(c) obtaining the product of the preliminary surface function and the auxiliary function;
(d) evaluating the product obtained in step (c) for astigmatism and orthoscopy;
(e) modifying the auxiliary function selected in step (b);
(f) repeating steps (b) through (e) until a final product function is evaluated to have the desired astigmatism and orthoscopy characteristics in the intermediate and near zones; and
(g) forming a lens responsive to the final product function.

43. The method of claim 42 further comprising the step of:

(h) using said lens to profile a former for further formation of such lenses.

44. The method of claim 42 wherein a factor $S(y)$ of the auxiliary function is of the form:

$$S(y) = e - (y - y_c/\sigma_y)^3 \quad y > y_c$$

$$S(y) = 1 \quad y \leq y_c$$

where y is a cartesian coordinate, and where $y_c$ and $\sigma_y$ are constants, whereby the constants are selected to reduce astigmatism in a portion of the lens lying above the line $y_c = y$.

45. The method of claim 42 wherein a factor $U(u)$ of the auxiliary function is of the form:

$$U(u) = e^{-(u/\sigma_u)^4} \text{ for all } u,$$

where u is a coordinate of a curvilinear coordinate system in which the line $u = o$ is the eye path, and where $\sigma_u$ is a constant, whereby the constant $\sigma_u$ is selected to improve orthoscopy in a portion of the intermediate zone on both sides of the eye path.

* * * * *

UNITED STATES PATENT AND TRADEMARK OFFICE
CERTIFICATE OF CORRECTION

PATENT NO. : 4,676,610
DATED : June 30, 1987
INVENTOR(S) : Eric F. Barkan; David H. Sklar It is certified that error appears in the above-identified patent and that said Letters Patent is hereby corrected as shown below:     Title page:

[57]  ABSTRACT - line 9, change "provided" to --provide--.

Col. 7, line 26, change "of a eye path" to --of an eye path--.

Col. 11, line 65, change "consistant" to --consistent--.

Col. 12, line 58, delete "first".

Col. 13, line 47, change "$z_s|_{v=\lambda}$" to --$z_s|_{v=-\lambda}$--.

Col. 14, line 26, change "point" to --points--.

Col. 16, line 11, change "Evaluated" to --evaluated--.

Col. 19, line 38, in the equation, change "$\delta y^3$" to --$\delta^3 y$--.    (45)

Col. 20, line 7, change "In the FIG. 7a" to --In FIG. 7a--.

Col. 23, line 29, change "$u^i$ and $v^i$" to --$u^i$ and $v^j$--.

Col. 25, line 27, change "$Y_c$" to --$y_c$--.

UNITED STATES PATENT AND TRADEMARK OFFICE
CERTIFICATE OF CORRECTION

PATENT NO. : 4,676,610

DATED : June 30, 1987

INVENTOR(S) : Eric F. Barkan; David H. Sklar

It is certified that error appears in the above-identified patent and that said Letters Patent is hereby corrected as shown below:

Col. 1, line 42, change "are" to --at--.

Col. 3, line 62, delete "the".

Col. 7, line 30, change "coordiate" to --coordinate--.
      line 44, change "ui and vj" to --$u^i$ and $v^j$--.

Col. 8, line 8, change $y=(v+v_1)(au^21)$ to
--$y=(v+v_1)(au^2+1)$--.       (2B)
   line 31, change "V = 0" to --$v=0$--.

Col. 9, line 3, in the equation, change "$\theta_d v_1$" to --$\theta_d$-$v_1$--.
   line 9, change "Paphson" to --Raphson--.
   line 24, change "Paphson" to --Raphson--.

UNITED STATES PATENT AND TRADEMARK OFFICE
CERTIFICATE OF CORRECTION

PATENT NO. : 4,676,610

DATED : June 30, 1987

INVENTOR(S) : Eric F. Barkan; David H. Sklar

It is certified that error appears in the above-identified patent and that said Letters Patent is hereby corrected as shown below:

Col. 10, line 14, in the equation, change "f(u)" to --f'(u)--.
line 16, change "where f'(u)" to --where f'(u)--.

line 20, change "$u_{n+1} = u_n - f(u_n)/f(u_n)$" to
--$u_{n+1} = u_n - f(u_n)/f'(u_n)$--.

line 65, change "$y_x = 0 = y_u u_x + y_v v_y$" to
--$y_x = 0 = y_u u_x + y_v v_x$--.

Col. 11, line 43, in the equation change "$[R_d^2 - (x-\Delta_x)^2 - (y-\Delta_y)^2]^{1/2}$" to --$[R_d^2 - (x-\Delta_x)^2 - (y-\Delta_y)^2]^{1/2}$--.     (21)

line 56, in the equation, change "$\bar{z} \vee \bar{z}$"
to --$\bar{z} \vee \bar{z}$--.     (22B)

Col. 12, line 9, change "$Z_s = A_s[(x-x_o)^2 + (y-y_o)^2 + B_s[(x-x_o)^2 + (y-y_o)^2 + z_o$" to --$Z_s = A_s[(x-x_o)^2 + (y-y_o)^2] + B_s[(x-x_o)^2 + (y-y_o)^2]^2 + z_o$--.     (23)

UNITED STATES PATENT AND TRADEMARK OFFICE
CERTIFICATE OF CORRECTION

PATENT NO. : 4,676,610

DATED : June 30, 1987

INVENTOR(S) : Eric F. Barkan; David H. Sklar

It is certified that error appears in the above-identified patent and that said Letters Patent is hereby corrected as shown below:

Col. 12, line 27, change "$S(y) = \exp[-(y-y_c)^3/\delta_y^3] \, y > y_c$ (selected region)" to --$S(y) = \exp[-(y-y_c)^3/\mathcal{S}_y^3] \quad y > y_c$ (24A) (selected region)--.

line 27, in the equation, change "$\leqq$" to --$\leq$-- . (24B)

line 35, change "$U(u)=\exp[-(u/\mathcal{S}_u)^4]$ for all u" to --$U(u) = \exp[-(u/\mathcal{S}_u)^4]$ for all u--.

line 46, change "constrains" to --constraints--.

Col. 17, line 33, change "zero" to --zone--.

Col. 18, line 2, change "$X_0$" to --$x_0$--.

Col. 19, line 34, in the equation, change (iy)" to --(y)--.

Col. 20, line 32, change "manifacture" to --manufacture--.

Col. 21, line 58, change "$\Delta_y$Such" to --$\Delta_y$. Such--.

UNITED STATES PATENT AND TRADEMARK OFFICE
CERTIFICATE OF CORRECTION

PATENT NO. : 4,676,610

DATED : June 30, 1987

INVENTOR(S) : Eric F. Barkan; David H. Sklar

It is certified that error appears in the above-identified patent and that said Letters Patent is hereby corrected as shown below:

Col. 25, line 24, change "$S(y)=e-(y-y_c/\delta_y)^3$" to --$S(y)=e^{-(y-y_c/\delta_y)^3}$--.

Col. 26, line 45, change "$v_j$" to --$v^j$--.

Col. 30, line 6, change "$S(y) = e -(y-y_c/\delta_y)^3 \quad y > y_c$" to --$S(y) = e^{-(y-y_c/\delta_y)^3} \quad y > y_c$--.

Signed and Sealed this

Thirteenth Day of December, 1988

Attest:

DONALD J. QUIGG

*Attesting Officer*     *Commissioner of Patents and Trademarks*